United States Patent
Nakamura et al.

(10) Patent No.: US 9,110,204 B2
(45) Date of Patent: Aug. 18, 2015

(54) LIGHT EMITTING DEVICE, DISPLAY UNIT, AND ILLUMINATION UNIT

(71) Applicant: Sony Corporation, Tokyo (JP)

(72) Inventors: Tomoharu Nakamura, Tokyo (JP); Kazue Shimizu, Kanagawa (JP); Gen Yonezawa, Kanagawa (JP); Shingo Ohkawa, Saitama (JP)

(73) Assignee: Sony Corporation (JP)

( * ) Notice: Subject to any disclaimer, the term of this patent is extended or adjusted under 35 U.S.C. 154(b) by 168 days.

(21) Appl. No.: 13/856,707

(22) Filed: Apr. 4, 2013

(65) Prior Publication Data

US 2013/0271700 A1  Oct. 17, 2013

(30) Foreign Application Priority Data

Apr. 11, 2012  (JP) ................. 2012-090213

(51) Int. Cl.
*G02F 1/1335* (2006.01)
*F21V 8/00* (2006.01)
*G02F 1/1333* (2006.01)

(52) U.S. Cl.
CPC ............. *G02B 6/0026* (2013.01); *G02B 6/0068* (2013.01); *G02F 1/133615* (2013.01); *G02F 2001/133317* (2013.01); *G02F 2001/133614* (2013.01)

(58) Field of Classification Search
CPC .......................... G02F 1/133615; G02B 6/0068
See application file for complete search history.

(56) References Cited

U.S. PATENT DOCUMENTS

| | | | |
|---|---|---|---|
| 2010/0165235 A1 | 7/2010 | Lee et al. | |
| 2012/0050649 A1* | 3/2012 | Yeo | ................ 349/65 |
| 2013/0169886 A1 | 7/2013 | Kuromizu | |

FOREIGN PATENT DOCUMENTS

| | | |
|---|---|---|
| EP | 2392852 A2 | 12/2011 |
| JP | 03114805 B2 | 12/2000 |
| JP | 3116727 B2 | 12/2000 |
| JP | 2011222665 A | 11/2011 |
| WO | 2012039196 A1 | 3/2012 |

OTHER PUBLICATIONS

European Search Report from EP Application No. 13162076, dated Jul. 25, 2013.

* cited by examiner

*Primary Examiner* — Phu Vu

(74) *Attorney, Agent, or Firm* — Lerner, David, Littenberg, Krumholz & Mentlik, LLP

(57) ABSTRACT

A light emitting device includes: a light source; an optical component including a light incident surface, the light incident surface facing the light source; and a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

15 Claims, 21 Drawing Sheets

LIGHT EMITTING DEVICE, DISPLAY UNIT, AND ILLUMINATION UNIT

CROSS-REFERENCE TO RELATED APPLICATION

The present application claims priority from Japanese Patent Application No. JP 2012-090213 filed in the Japanese Patent Office on Apr. 11, 2012, the entire content of which is incorporated herein by reference.

BACKGROUND

The present disclosure relates to a light emitting device favorable for a surface light source, and to a display unit and an illumination unit that each include the light emitting device.

A surface-emitting device that uses a blue light emitting diode (LED) is employed, for example, in a backlight of a liquid crystal display unit or in an illumination unit. For example, Japanese Patent No. 3116727 discloses to obtain white light by providing a film to which a fluorescent material is applied to a light emission observation surface of a light guide plate and converting, by the fluorescent material, a wavelength of the light entering the light guide plate from a blue LED. Moreover, for example, Japanese Patent No. 3114805 discloses to provide a wavelength converter, in which a fluorescent material is mixed with an elastic body, between a blue LED and an end face of a light guide plate.

SUMMARY

In general, it is strongly desired to increase evenness of color in a plane in a light emitting device that is used as a surface light source.

It is desirable to provide a light emitting device capable of increasing evenness of color in a plane, and to provide a display unit and an illumination unit that each include the light emitting device.

According to an embodiment of a present disclosure, there is provided a light emitting device including: a light source; an optical component including a light incident surface, the light incident surface facing the light source; and a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

In the light emitting device according to the embodiment of the present disclosure, light emitted from the light source is subjected to wavelength conversion in the wavelength conversion member, enters the light incident surface of the optical component, travels through the inside of the optical component, and exits from a light emitting surface. This is observed as light emission. Here, the wavelength conversion member crosses the first region surrounded by the light incident surface and the light paths of the light being emitted from the light source and entering the edges of the light incident surface, and extends to the second region outside the first region. This reduces light that does not pass through the wavelength conversion member out of the light emitted from the light source. In other words, this reduces light that is not subjected to wavelength conversion in the wavelength conversion member.

According to an embodiment of the present disclosure, there is provided a display unit with a liquid crystal panel and a light emitting device on a back face side of the liquid crystal panel, the light emitting device including: a light source; an optical component including a light incident surface, the light incident surface facing the light source; and a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

In the display unit according to the embodiment of the present disclosure, the light emitted from the light emitting device is selectively transmitted by the liquid crystal panel and an image is displayed thereby.

According to an embodiment of the present disclosure, there is provided an illumination unit with a light emitting device, the light emitting device including: a light source; an optical component including a light incident surface, the light incident surface facing the light source; and a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

In the illumination unit according to the embodiment of the present disclosure, illumination is performed with light emitted from the light emitting device.

According to the light emitting device of the embodiment of the present disclosure, the wavelength conversion member crosses the first region surrounded by the light incident surface and the light paths of the light entering the edges of the light incident surface and extends to the second region outside the first region. Therefore, evenness of color in a plane is increased. According to each of the display unit and the illumination unit of the embodiments of the present disclosure, the light emitting device of the embodiment of the present disclosure is included. Therefore, high quality in display or in illumination is achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the present disclosure will be hereinafter described in detail with reference to the attached drawings. Description will be given in the following order.

1. First Embodiment (light emitting device; an example in which a wavelength conversion member crosses a region surrounded by a light incident surface and light paths of light being emitted from a light source and entering edges of the light incident surface, and the wavelength conversion member extends to a region outside this region)

2. Second Embodiment (light emitting device; an example in which a light shielding member is provided on a light path of light that is emitted from the light source, passes through a container without passing through the wavelength conversion member, and travels toward a surface adjacent to the light incident surface of the light guide plate)

3. Third Embodiment (display unit; liquid crystal display unit)

4. Application Examples 1 to 6 of Display Unit

5. Application Examples 7 to 9 of Illumination Unit

First Embodiment

Figure 1:
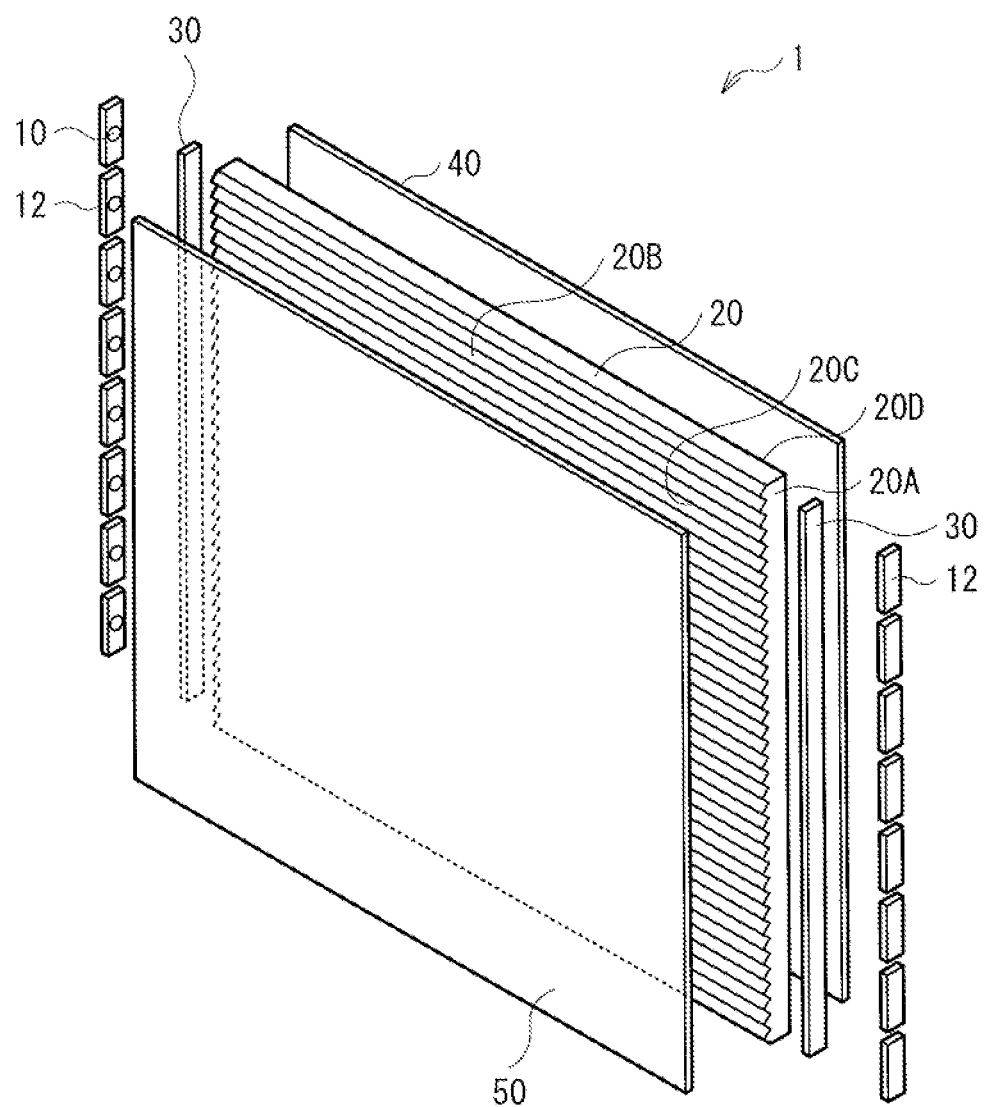
FIG. 1 is a perspective view illustrating a general configuration of a light emitting device according to a first embodiment of the present disclosure.

FIG. 1 illustrates a general configuration of a light emitting device (light emitting device 1) according to a first embodiment of the present disclosure. The light emitting device 1 may be used, for example, as a backlight that illuminates a transmissive liquid crystal panel from the back thereof, or as an illumination unit, for example, in a room. The light emitting device 1 includes a light source 10, a light guide plate 20, a wavelength conversion member 30, a reflection member 40, and an optical sheet 50. The light guide plate 20 corresponds to a specific but not limitative example of "optical component" of the present disclosure.

In the present specification, a lamination direction of the optical sheet 50, the light guide plate 20, and the reflection member 40 is referred to as "Z direction (front-back direction)", a lateral direction in a main surface (largest surface) of the guide plate 20 is referred to as "X direction", and a vertical direction is referred to as "Y direction".

The light source 10 is a point light source and is configured of a light emitting diode (LED), specifically. The light source 10 may be enclosed in a package 11 (not illustrated in FIG. 1, see FIG. 2) and may be mounted on a light source substrate 12, for example. The light source 10 may face a light incident surface 20A (for example, left and right end faces in FIG. 1) of the light guide plate 20, for example. The light source substrate 12 may have an elongated rectangular-parallelepiped shape and may be arranged in a line in a longitudinal direction thereof, for example.

The light guide plate 20 guides light emitted from the light source 10, from the light incident surface 20A to a light emitting surface 20B. The light guide plate 20 may be configured, for example, mainly of a transparent thermoplastic resin such as a polycarbonate resin (PC) and an acrylic resin (such as polymethyl methacrylate (PMMA)). The light guide plate 20 may have, for example, a rectangular-parallelepiped shape that is configured of a pair of main surfaces (front and back faces) facing each other in the front-back direction (Z direction) and four end faces (side faces) adjacent thereto from the top, bottom, left, and right thereof.

Left and right end faces of the light guide plate 20 are each configured to be the light incident surface 20A on which light emitted from the light source 10 is incident, as described above. It is to be noted that only one of the left and right end faces of the light guide plate 20 may be configured to be the light incident surface 20A. Alternatively, three of the end faces of the light guide plate 20 may each be configured to be the light incident surface 20A. Alternatively, all of the four end faces may each be configured to be the light incident surface 20A.

The front face and the back face of the light guide plate 20 are configured to be light emitting surfaces 20B and 20D that emit light incident from the light incident surface 20A, respectively. The light emitting surface 20B (front face) and the light emitting surface 20D (back face) of the light guide plate 20 each have a plane shape corresponding to an object-to-be-illuminated (such as a liquid crystal panel 122 described later) that is arranged on the light emitting surface 20B side of the light guide plate 20.

The light emitting surface 20B (front face) of the light guide plate 20 may have, for example, a concavo-convex pattern that is formed of fine convex sections 20C in order to improve straightness of light that propagates in the light guide plate 20. The convex sections 20C may be, for example, strip-like protrusions or ridges that extend in one direction (for example, in the lateral direction) of the light emitting surface 20B. The light emitting surface 20D (back face) of the light guide plate 20 may have, for example, a scattering agent printed thereon in a pattern as a scattering section that scatters light that propagates in the light guide plate to be uniform. It is to be noted that a section that includes filler may be provided or the surface may be partially roughened to provide the scattering section, instead of providing the scattering agent.

The wavelength conversion member 30 converts a wavelength of light emitted from the light source 10. The wavelength conversion member 30 is provided between the light source 10 and the light incident surface 20A of the light guide plate 20. The wavelength conversion member 30 may preferably include a fluorescent material, for example. Specifically, it is preferable that the light source 10 be a blue light source and the wavelength conversion member 30 include a fluorescent material that performs wavelength conversion on blue light from the light source 10 to allow the blue light to be converted into red light or green light. Thus, light of various colors is generated in the light emitting device 1 by synthesizing red light and green light resulting from wavelength conversion by the wavelength conversion member 30.

Moreover, the wavelength conversion member 30 may preferably include a quantum dot, for example. In other words, it is preferable that the light source 10 be a blue light source and the wavelength conversion member 30 include a quantum dot that performs wavelength conversion on the blue light from the light source 10 to allow the blue light to be converted into red light or green light. The quantum dot has a discrete energy level and the light emission wavelength is freely selected by changing the size of the dot. Spectrum of the obtained red and green light has a narrow half-band width and a precipitous peak. Therefore, chromatic purity of the red and green light increases and color gamut of synthesized light thereof is widened. Accordingly, color gamut is expanded compared to an existing light emitting device that uses white LEDs and a fluorescent material.

The reflection member 40 is a plate-like or sheet-like member that is provided on the light emitting surface 20D (back face) side of the light guide plate 20. The reflection member 40 returns, toward the light guide plate 20, light that has been emitted from the light source 10 and has been escaped toward the light emitting surface 20D of the light guide plate or light that has traveled toward the light emitting surface 20D from the inside of the light guide plate 20. The reflection member 40 may have functions such as reflection, diffusion, and scattering, for example. Therefore, it is possible to efficiently utilize light emitted from the light source 10 and to increase front luminance.

The reflection member 40 may be configured of, for example, foamed PET (polyethylene terephthalate), a silver-deposited film, a multi-layered reflection film, or white PET. When the reflection member 40 has a regular reflection (mirror reflection) function, a surface of the reflection member 40 is preferably subjected to a process such as silver deposition, aluminum deposition, and multilayer reflection. When the reflection member 40 has a fine shape, the reflection member 40 may be integrally formed by a method such as heat press molding with use of a thermoplastic resin and melt extrusion molding. Alternatively, the reflection member 40 may be formed, for example, by applying an energy-ray (such as ultraviolet ray) curable resin onto a base formed of a material such as PET, and then, transferring a shape to the energy-ray curable resin. In this example, examples of the thermoplastic resin include a polycarbonate resin, an acrylic resin such as PMMA (polymethyl methacrylate), a polyester resin such as polyethylene terephthalate, an amorphous copolymerized polyester resin such as MS (copolymer of methyl methacrylate and styrene), a polystyrene resin, and a polyvinyl chloride resin. Further, the base may be made of glass when a shape is transferred to an energy-ray (such as ultraviolet ray) curable resin.

The optical sheet 50 is provided on the light emitting surface 20B (front face) side of the light guide plate 20. The optical sheet 50 may include, for example, a diffusing plate, a diffusing sheet, a lens film, a polarization separation sheet, and/or the like. FIG. 1 illustrates only one of the optical sheet 50 configured of the plurality of sheets described above. Provision of such an optical sheet 50 allows light emitted from the light guide plate 20 in an oblique direction to travel upward in a front face direction. This further increases front luminance.

Figure 2:
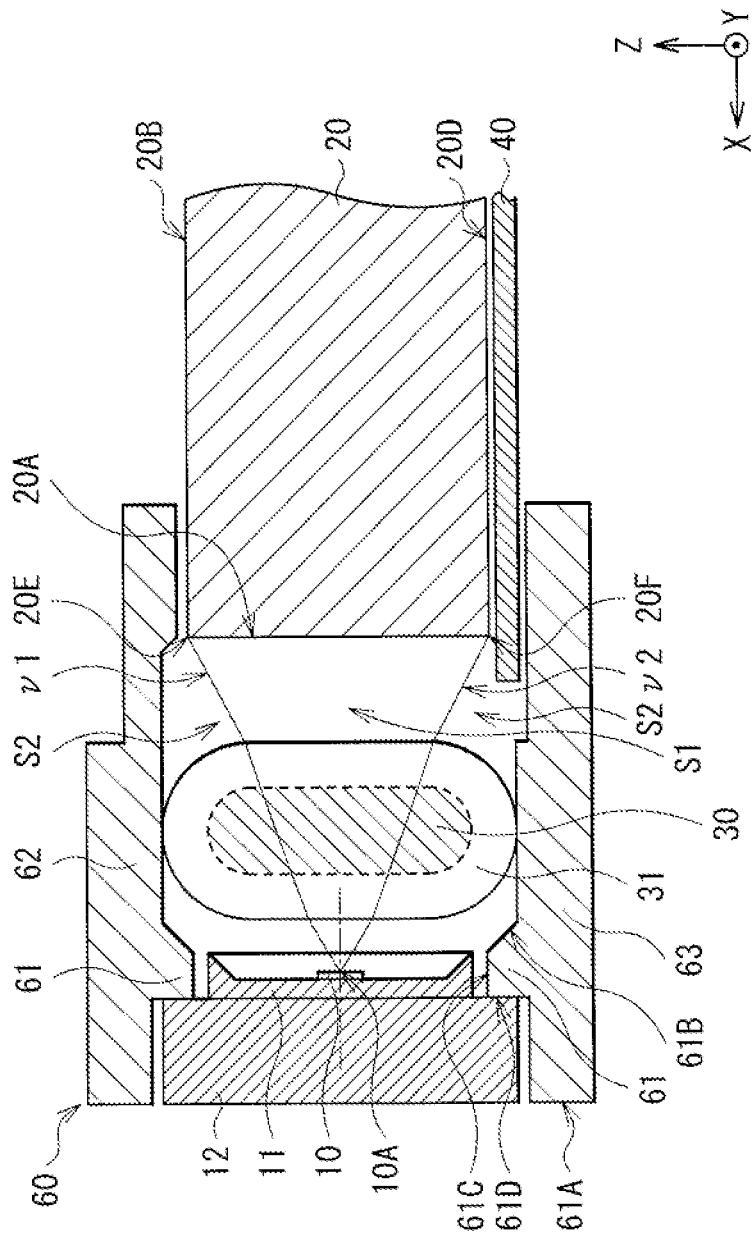
FIG. 2 is a cross-sectional view illustrating an arrangement relationship between a light source, a light guide plate, and a wavelength conversion member shown in FIG. 1.

FIG. 2 illustrates an arrangement relationship between the light source 10, the light guide plate 20, and the wavelength conversion member 30 shown in FIG. 1, and illustrates a cross-section that includes the light emission center 10A of the light source 10 and is perpendicular to the light incident surface 20A. The light source 10 is arranged to face the light incident surface 20A of the light guide plate 20, and the wavelength conversion member 30 is arranged between the light source 10 and the light incident surface 20A, as described above. The reflection member 40 is laid on the light emitting surface 20D (back face) side of the light guide plate 20.

The wavelength conversion member 30 is preferably contained and sealed in a tube-like container (capillary) 31 made of a material such as glass. One reason is that this suppresses a change in characteristics of the wavelength conversion member 30 due to moisture, oxygen, or the like in the air and allows the wavelength conversion member 30 to be easily handled. It is to be noted that the wavelength conversion member 30 as described above may be manufactured as follows, for example. A fluorescent material or a quantum dot is mixed with an ultraviolet-ray curable resin. The obtained mixture is put into the container 31 configured of, for example, a glass tube, and one side of the container 31 is sealed. An ultraviolet ray is applied to cure the resin. Thus, a gel wavelength conversion member 30 with a certain level of viscosity is formed.

The wavelength conversion member 30 crosses a region S1 that is surrounded by the light incident surface 20A and light paths of light v1 and light v2 that travel from the light source 10 and enter edges (an upper edge 20E and an lower edge 20F) of the light incident surface 20A. The wavelength conversion member 30 also extends to a region S2 outside the region S1. Thus, evenness of color in a plane is increased in the light emitting device 1.

The light source 10 and the wavelength conversion member 30 shown in FIG. 2 may be held by a holding member (holder) 60, for example. The holding member 60 may be configured, for example, of a highly-reflective polycarbonate resin or a polyamide-based resin (such as "Genestar (trade name)" available from Kuraray Co., Ltd.). The holding member 60 may include a first holding portion 61 that holds the light source 10 and may include a second holding portion 62 and a third holding portion 63 that hold the wavelength conversion member 30.

The first holding portion 61 is a portion to which the light source substrate 12 with the light source 10 mounted thereon is attached. The first holding portion 61 faces the light incident surface 20A. The holding portion 61 includes, in a central part thereof, an opening 61C that runs through from an outer face 61A to an inner face 61B. The opening 61C includes, in a portion thereof closer to the outer face 61A, a seat portion 61D that is formed by recessing a circumference of the opening 61C in a step-like shape. Thus, the seat portion 61D holds the light source substrate 12, thereby allowing the package 11 provided with the light source 10 to be loosely set into the opening 61C. It is to be noted that the seat portion 61D may not be necessarily provided depending on dimensions of the light source substrate 12. Further, a part or all of the inner face 61B is desirably sloped in order to increase efficiency of utilizing light emitted from the light source 10.

The second holding portion 62 and the third holding portion 63 sandwich upper and lower ends of the container 31 including the wavelength conversion member 30 to hold the container 31 so that, for example, the position and the orientation of the container 31 do not change. The second holding portion 62 and the third holding portion 63 may extend from an upper end and a lower end of the first holding portion in a direction substantially perpendicular to the first holding portion 61. Therefore, the first holding portion 61, the second holding portion 62, and the third holding portion may have cross-sectional shapes that configure, for example, three sides of a rectangular. The upper and lower ends of the container 31 may be, for example, caught by protrusions (not illustrated) for holding that are provided in the second holding portion 62 and the third holding portion 63. Thus, the upper and lower ends of the container 31 are fixed to the second holding portion 62 and the third holding portion 63. It is to be noted that the upper and lower ends of the container 31 may be fixed by other methods such as using a double-faced adhesive tape.

Moreover, a tip end of the second holding portion 62 and a tip end of the third holding portion 63 sandwich and hold an end of the light guide plate 20 and an end of the reflection member 40. It is to be noted that it is enough that the second holding portion 62 and the third holding portion 63 sandwich at least the upper and lower ends of the container 31. The end of the light guide plate 20 and the end of the reflection member 40 may be held by other members (which will be described later).

It is to be noted that a not-illustrated heat dissipation member (heat spreader) is attached to the outside of the above-described holding member 60, in particular, around the light source 10. Moreover, the light emitting device 1 as a whole that includes components such as the light source 10, the light guide plate 20, the wavelength conversion member 30, the reflection member 40, the optical sheet 50, and the holding member 60, and the heat dissipation member (not illustrated) is contained in a chassis which is not illustrated (not illustrated in FIGS. 1 and 2, see a back chassis 124 in FIG. 15, for example).

In the light emitting device 1, light emitted from the light source 10 is subjected to wavelength conversion in the wavelength conversion member 30, enters the light incident surface 20A of the light guide plate 20, travels through the inside of the light guide plate 20, exits from the light emitting surface 20B, and passes through the optical sheet 50. This is observed as light emission.

Figure 3:
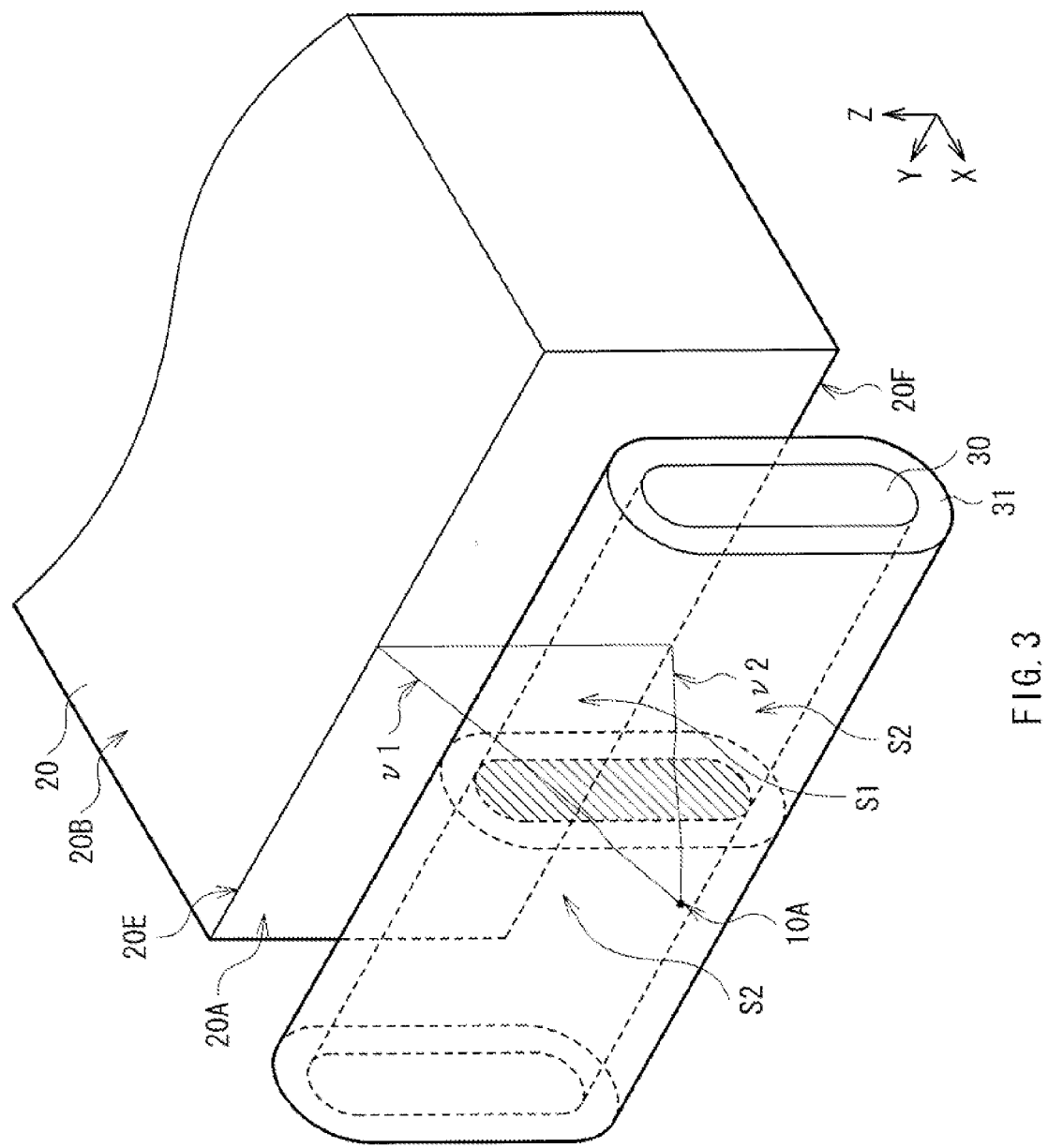
FIG. 3 is a perspective view illustrating beams of light that travel from the light source shown in FIG. 2 toward a light incident surface of the light guide plate shown in FIG. 2.

Here, the light source 10 is a point light source as described above. Therefore, light emitted from the light source 10 is spread from the light emission center 10A in all directions of 360° around. There is not any special issue in light spreading in the lateral direction since the wavelength conversion member 30 and the light incident surface 20A extend in the lateral direction as shown in FIG. 3. On the other hand, part of light spread in the vertical direction may deviate to a region above the upper edge 20E or may deviate to a region below the lower edge 20F.

Here, the wavelength conversion member 30 crosses the region S1 that is surrounded by the light incident surface 20A and the light paths of the light v1 and the light v2 that are emitted from the light source 10 and enter the edges (the upper edge 20E and the lower edge 20F) of the light incident surface 20A. In other words, the wavelength conversion member intersects with (crosses) the region S1 in a direction parallel to the light incident surface 20A. Therefore, light that passes through the inside of the region S1 and enters the light incident surface 20A is subjected to wavelength conversion in the wavelength conversion member 30.

Moreover, the wavelength conversion member 30 extends to the region S2 outside the region S1. In other words, the wavelength conversion member 30 is provided to spread over and out of the region S1 and to extend in the region S2 outside thereof. Therefore, light that is emitted from the light source 10 and spreads in the vertical direction to travel outside the region S1 is caught by the wavelength conversion member 30 in a certain degree and is subjected to wavelength conversion. Accordingly, in the light emitting device 1, light that does not pass through the wavelength conversion member 30 out of the light emitted from the light source 10, namely, light that is not subjected to wavelength conversion in the wavelength conversion member 30 is reduced. Therefore, evenness of color in a plane is improved.

As described above, in the present embodiment, the wavelength conversion member 30 crosses the region S1 that is surrounded by the light incident surface 20A and the light paths of the light v1 and the light v2 that are emitted from the light source 10 and enter the edges (the upper edge 20E and the lower edge 20F) of the light incident surface 20A. In addition thereto, the wavelength conversion member 30 extends to the region S2 outside the region S1. This reduces light that does not pass through the wavelength conversion member 30 out of the light emitted from the light source 10, namely, light that is not subjected to wavelength conversion in the wavelength conversion member 30. Thus, evenness of color in a plane is increased.

Second Embodiment

Figure 4:
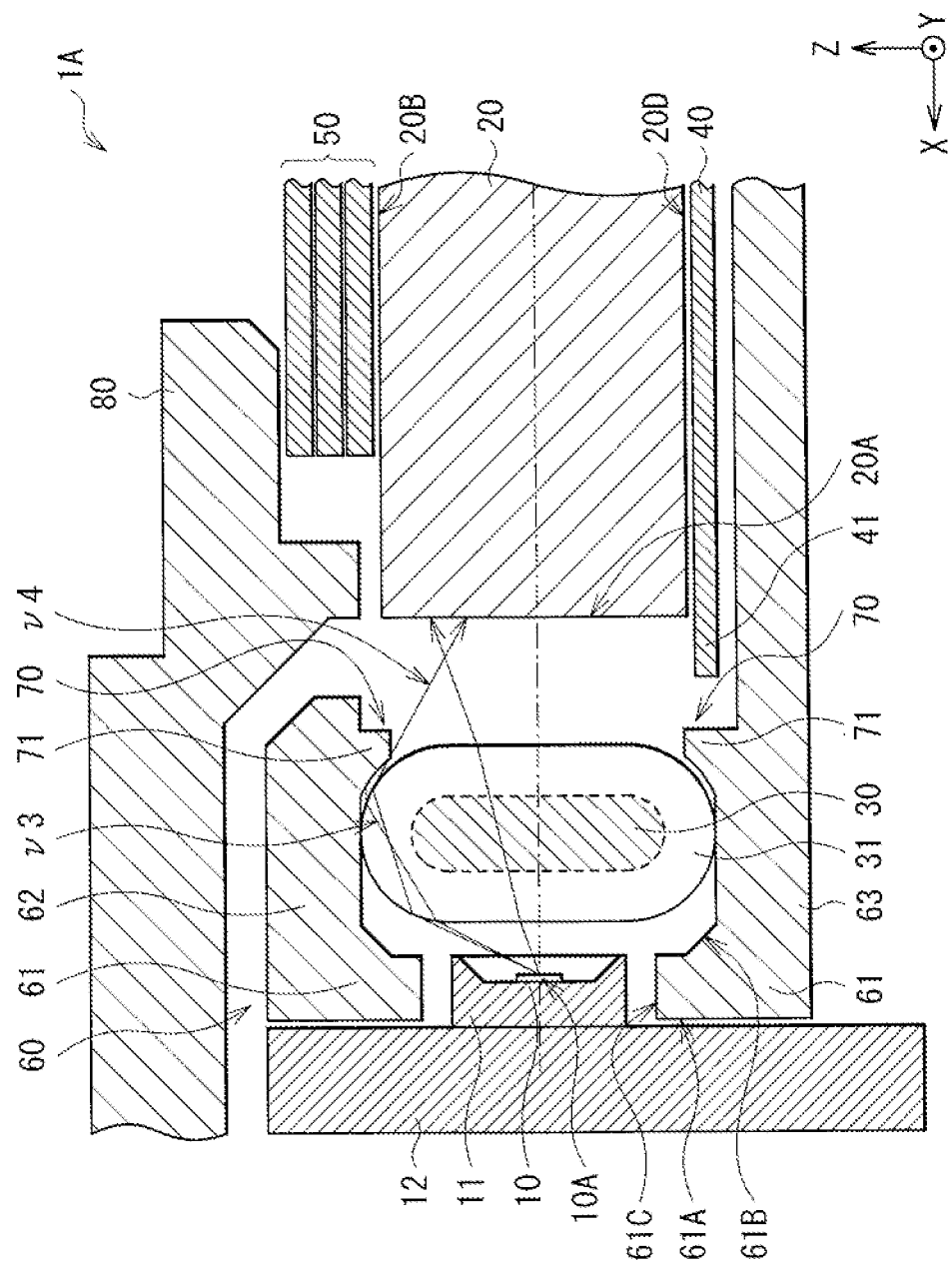
FIG. 4 is a cross-sectional view illustrating a configuration of a light emitting device according to a second embodiment of the present disclosure.

FIG. 4 illustrates a cross-sectional configuration of a light emitting device 1A according to a second embodiment of the present invention. The light emitting device 1A includes a light shielding member 70 between the light incident surface 20A of the light guide plate 20 and the container 31 which includes the wavelength conversion member 30. Thus, color unevenness that occurs in the vicinity of the light incident surface 20A is reduced and evenness of color in a plane is further increased. Except for this, the light emitting device 1A has a configuration, functions, and effects that are similar to those in the first embodiment. Therefore, the corresponding components are described with the same numerals.

The light source 10, the package 11, the light source substrate 12, the light guide plate 20, the wavelength conversion member 30, the container 31, the reflection member 40, and the optical sheet 50 each have a configuration similar to that in the first embodiment.

The holding member 60 includes the first holding portion 61 that holds the light source 10, and includes the second holding portion 62 and the third holding portion 63 that hold the wavelength conversion member 30, as in the first embodiment.

The holding portion 61 includes, in a central part thereof, the opening 61C that runs through from the outer face 61A to the inner face 61B. In the present embodiment, the seat portion 61D on the outer face 61A side of the opening 61C is not provided. The light source substrate 12 is fixed to the outer face 61A, and thereby, the package 11 with the light source 10 mounted thereon is loosely set into the opening 61C.

The second holding portion 62 holds, with the third holding portion 63, the upper end of the container 31 including the wavelength conversion member 30. It is to be noted that FIG. 4 illustrates a case in which the optical sheet 50 is arranged on the light emitting surface 20B of the light guide plate 20, and an end of the optical sheet 50 is held not by the second holding portion 62 but by a frame-like member 80 (see FIG. 15). The frame-like member 80 is a frame-like resin component that holds the optical sheet 50, which is a so-called middle chassis.

The third holding portion 63 holds, with the second holding portion 62, the lower end of the container 31 including the wavelength conversion member 30. The tip end of the third holding portion 63 extends on the back side of the light emitting surface 20D (back face) of the light guide plate 20 and of the reflection member 40.

The light shielding member 70 is provided on a light path of light v3 that is emitted from the light source 10, passes through the container 31 without passing through the wavelength conversion member 30, and travels toward a surface adjacent to the light incident surface 20A of the light guide plate 20, namely, toward the light emitting surface 20B or the light emitting surface 20D.

Figure 5:
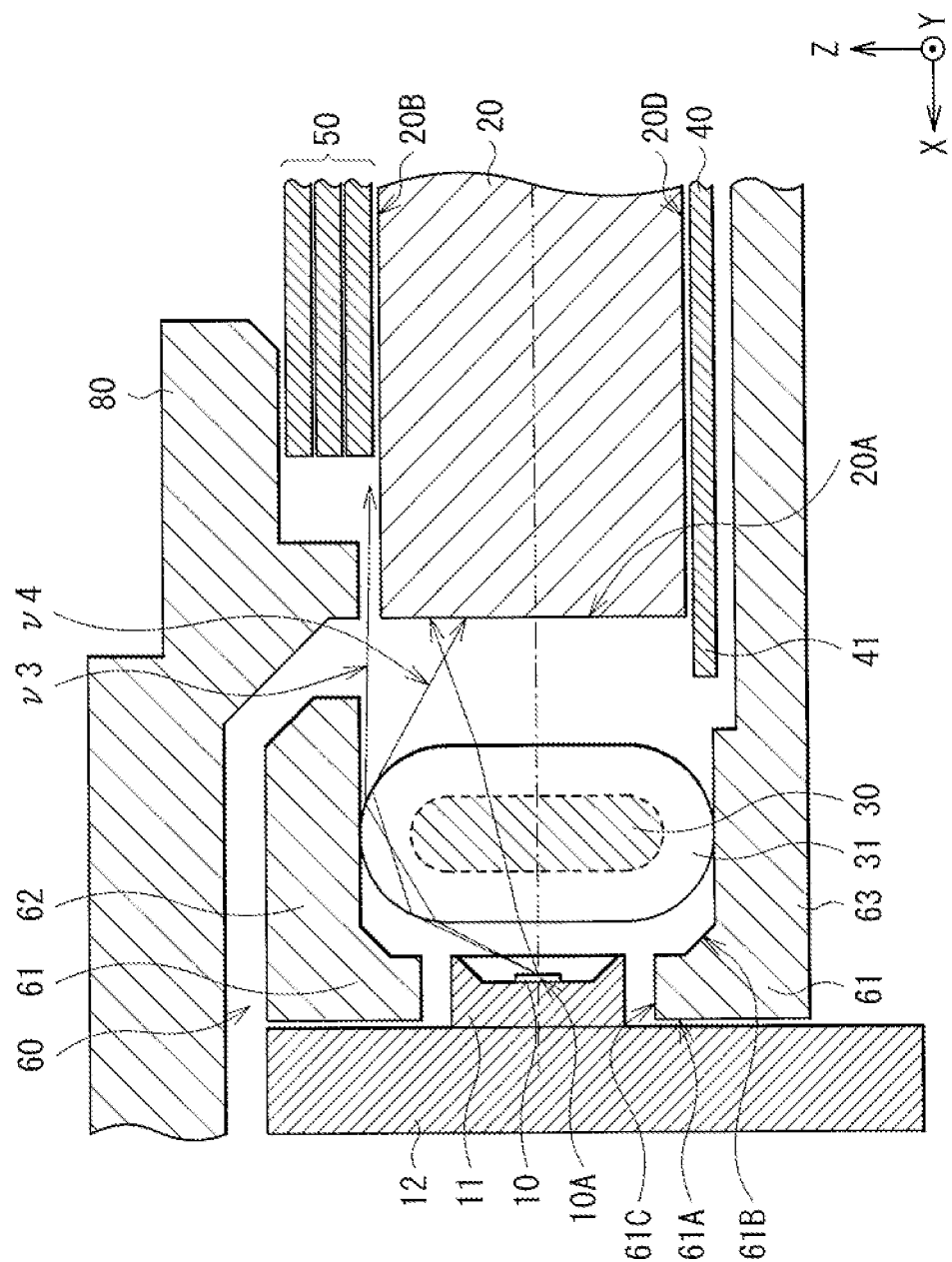
FIG. 5 is a cross-sectional view for explaining an example that does not include a light shielding member.
Figure 6:
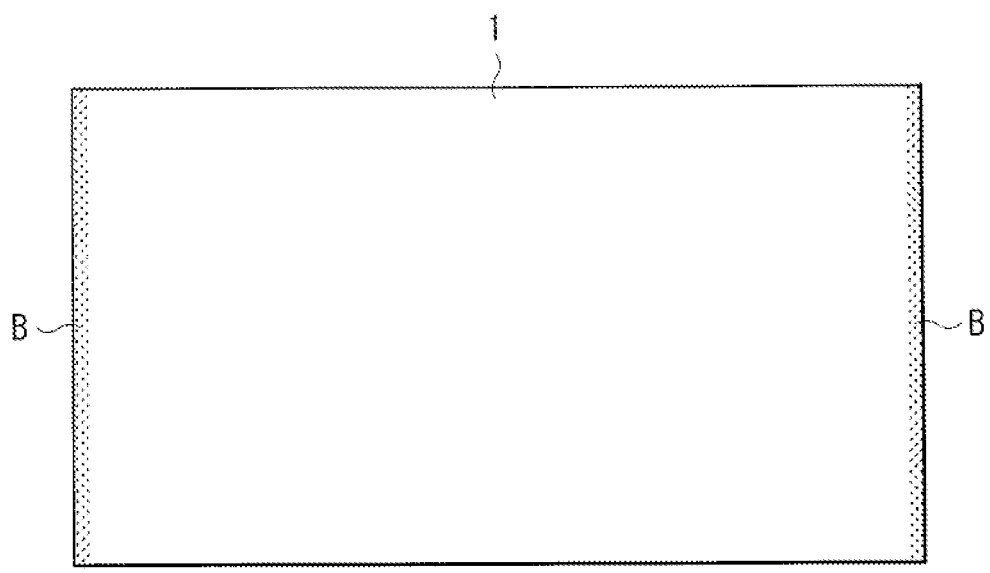
FIG. 6 is a plan view schematically illustrating a light emission state of the light emitting device shown in FIG. 5.

In other words, when the light shielding member 70 is not provided, the light v3 may pass through a space near the holding member 60, the frame-like member 80, etc., to enter the optical sheet 50, and may be emitted directly to the outside, as shown in FIG. 5. In this case, the light v3 is not subjected to wavelength conversion in the wavelength conversion member 30. Also, the light v3 is not mixed, in the light guide plate 20, with green or red light resulting from wavelength conversion. Therefore, the light v3 is emitted as blue light which is in a state unchanged from that at the time when the light v3 is emitted from the light source 10. Accordingly, blue color unevenness B caused by the light v3 is observed along right and left sides in which the light source 10 is provided, when the light emitting device 1 is seen from the front side of the optical sheet 50, as schematically shown in FIG. 6.

Figure 7:
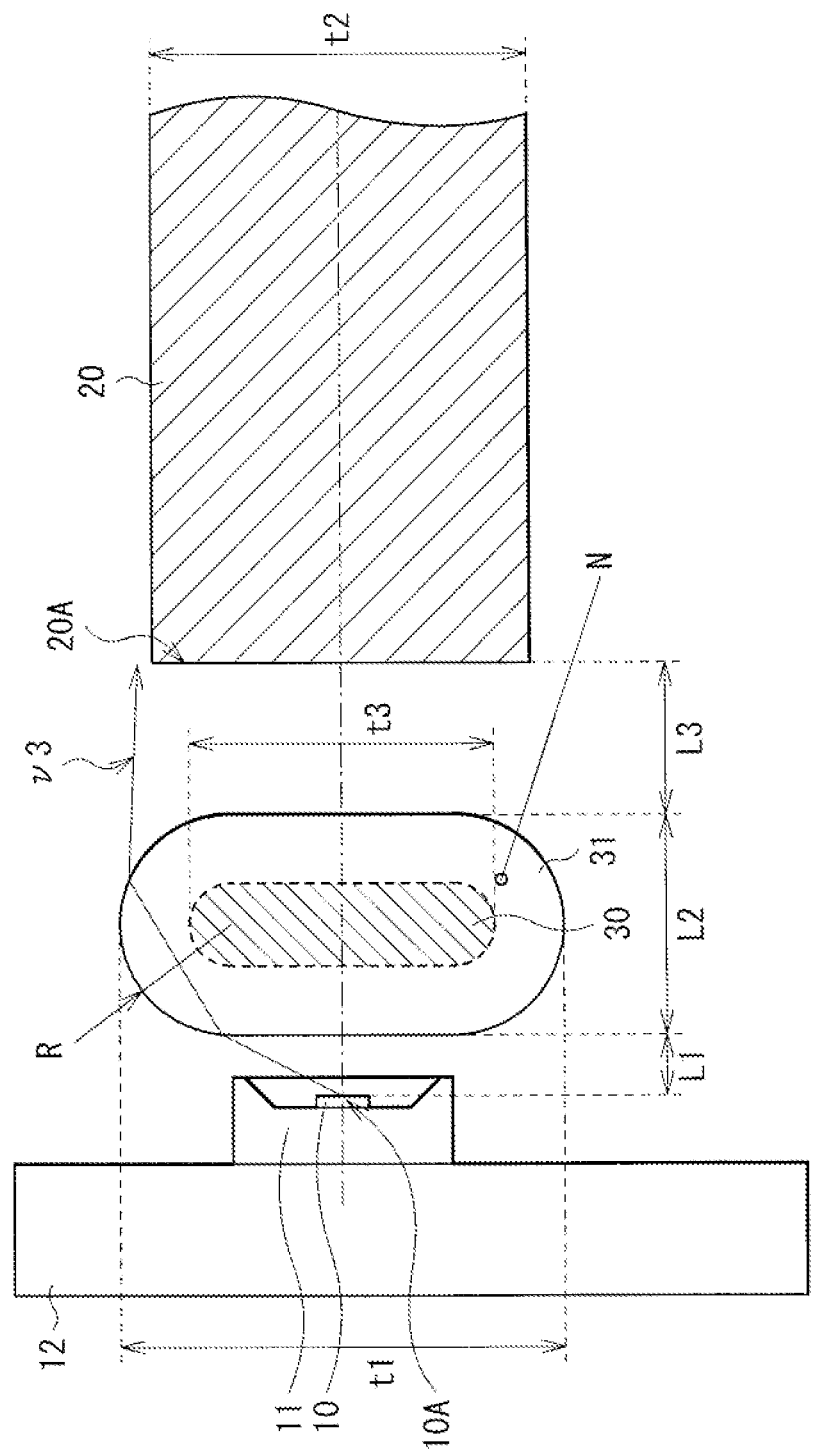
FIG. 7 is a cross-sectional view illustrating an example of dimensions of the light emitting device shown in FIG. 5.

The light v3 that causes the above-described color unevenness B is emitted from a portion 31A of the container 31. When specific values concerning dimensions and location relationship between the light source 10, the light guide plate 20, and the wavelength conversion member 30 are given, the portion 31A is specified based on the given specific values. For example, as shown in FIG. 7, a dimension t1 from the upper end to the lower end of the container 31 may be 4 mm, a thickness t2 of the light guide plate 20 may be 3.5 mm, and a maximum thickness t3 of the wavelength conversion member 30 may be 2.7 mm. For example, a distance L1 between the light emission center 10A of the light source 10 and the container 31 may be 0.6 mm, a thickness L2 of the container 31 in the lateral direction may be 2 mm, and a distance L3 between the container 31 and the light incident surface 20A may be 1.4 mm. For example, a thickness (difference between the outer diameter and an inner diameter) R of the container 31 may be 1 mm, and a refractive index N of the container 31 may be 1.51.

Figure 8:
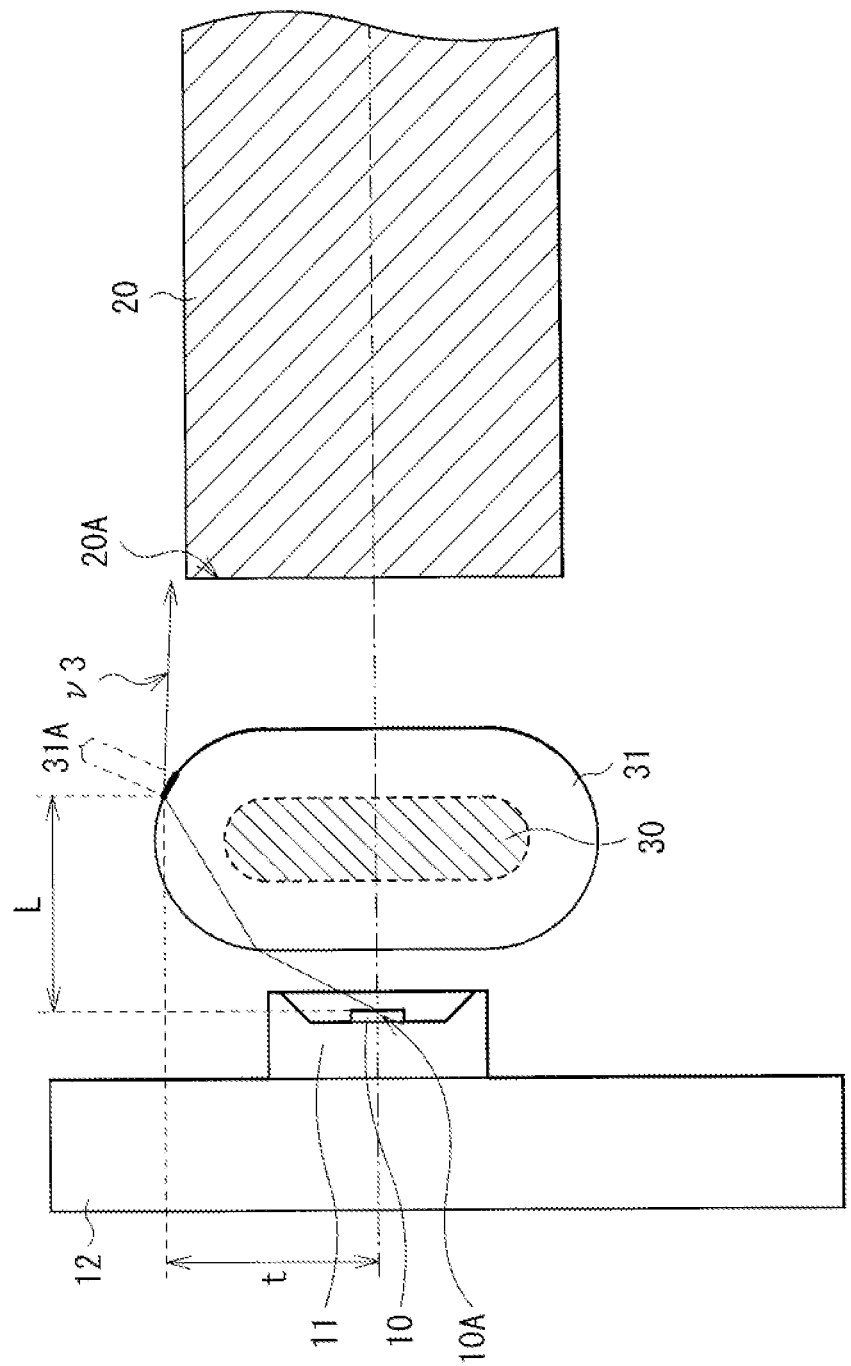
FIG. 8 is a cross-sectional view illustrating a portion that emits blue light in the light emitting device with the dimensions shown in FIG. 7.

In this case, the portion 31A from which the light v3 causing the color unevenness B is emitted is limited in a range that has a distance L from 1.95 nm to 2.16 nm both inclusive from the light emission center 10A of the light source 10 in the lateral direction, and that has a distance t from 1.83 mm to 1.94 mm both inclusive in a height direction, as shown in FIG. 8. Therefore, the light shielding member 70 is provided based on the above-described calculation to shield the light v3 and to suppress the color unevenness B. It is to be noted that the portion 31A from which the light v3 causing the color unevenness B is emitted is illustrated with a line thicker than an outline of the container 31 in FIG. 8.

In particular, the light shielding member 70 is preferably a light shielding protrusion 71 that is provided in each of the second holding portion 62 and the third holding portion 63 of the holding member 60, as shown in FIG. 4. Thus, the light v3 is shielded at a position extremely close to the portion from which the light v3 causing the color unevenness B is emitted. This securely suppresses occurrence of the color unevenness B. In addition thereto, this allows easy formation of the light shielding member 70 in a process of manufacturing the holding member 60 which is configured of a resin component.

Figure 9:
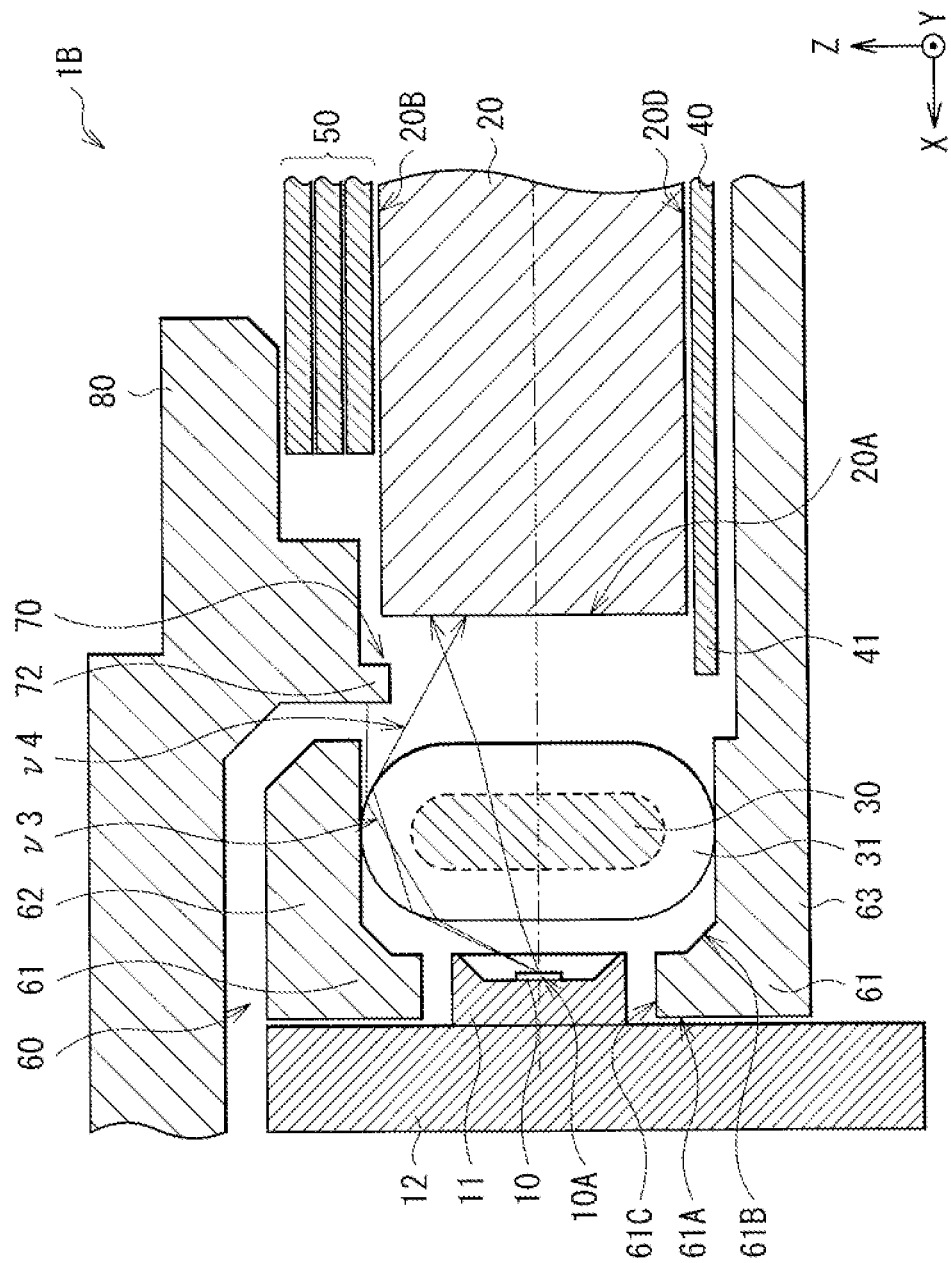
FIG. 9 is a cross-sectional view illustrating a modification of the light emitting device shown in FIG. 4.

Alternatively, it is also preferable that the light shielding member 70 be a light shielding protrusion 72 that is provided in the frame-like member 80 as shown in a light emitting device 1B in FIG. 9. This allows easy formation of the light shielding member 70 in a process of manufacturing the frame-like member 80 which is configured of a resin component.

Figure 10:
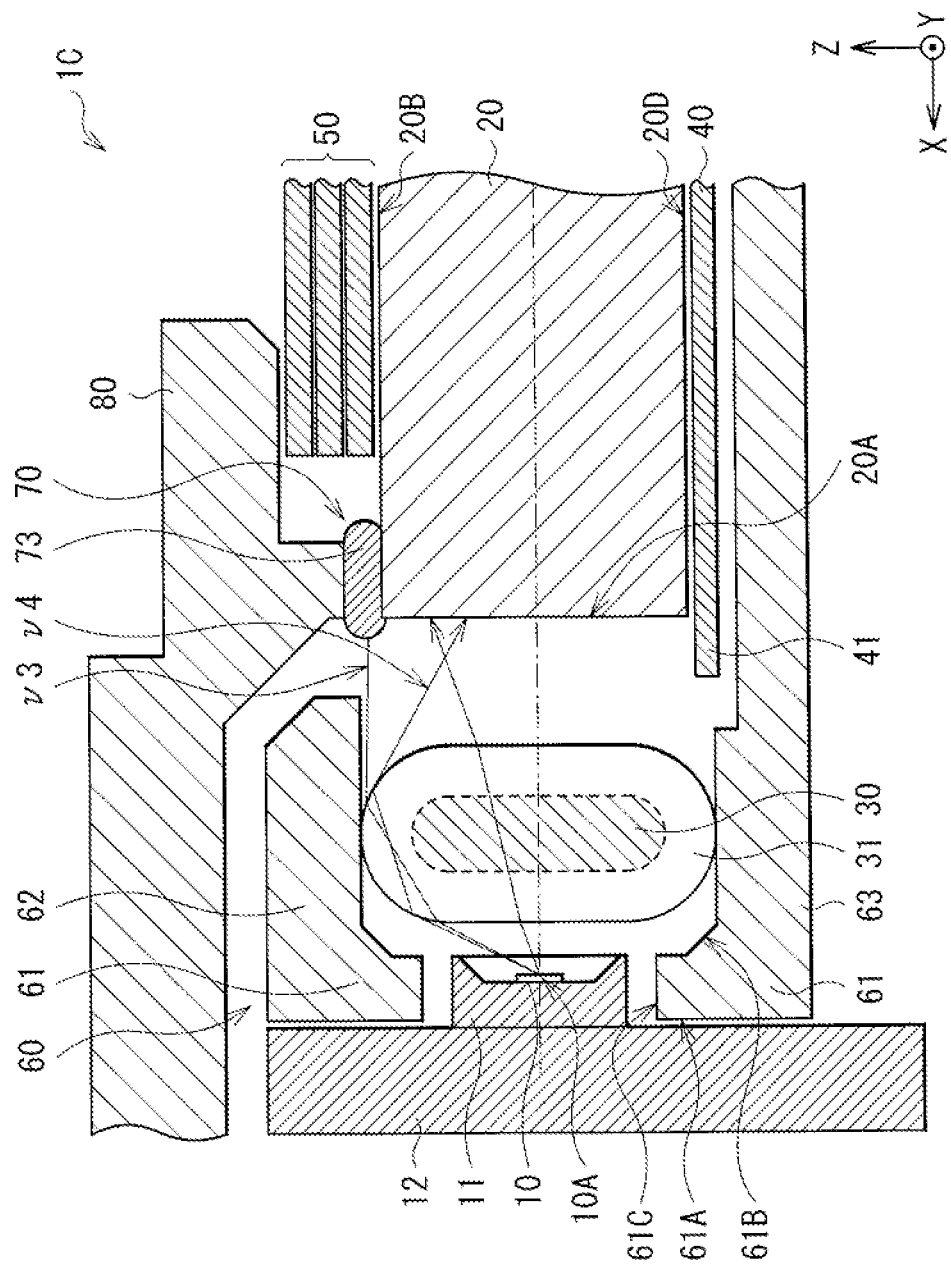
FIG. 10 is a cross-sectional view illustrating another modification of the light emitting device shown in FIG. 4.

Alternatively, it is also preferable that the light shielding member 70 be a light shielding cushion 73 that covers an end of a surface adjacent to the light incident surface 20A of the light guide plate 20, in particular, that covers an end of the light emitting surface 20B, as shown in a light emitting device 1C in FIG. 10. In this case, unlike providing the light shielding protrusion 71 or 72 shown in FIG. 4 or 9, it is possible to suppress reflection of light due to the light shielding protrusion 71 or 72. Thus, it is possible to further increase efficiency of utilizing light. Moreover, the light shielding cushion 73 is preferably sandwiched between the frame-like member 80 and the light emitting surface 20B of the light guide plate 20. This allows to adjust mechanical clearance between the frame-like member 80 and the light guide plate 20, or allows to reduce sounds which are made when the frame-like member 80 touches the light guide plate 20 made of a material different from that of the frame-like member 80. It may be preferable to use, for example, urethane foam ("PORON (registered trademark)" available from Rogers Inoac Corporation) as a material that configures the light shielding cushion 73.

Figure 11:
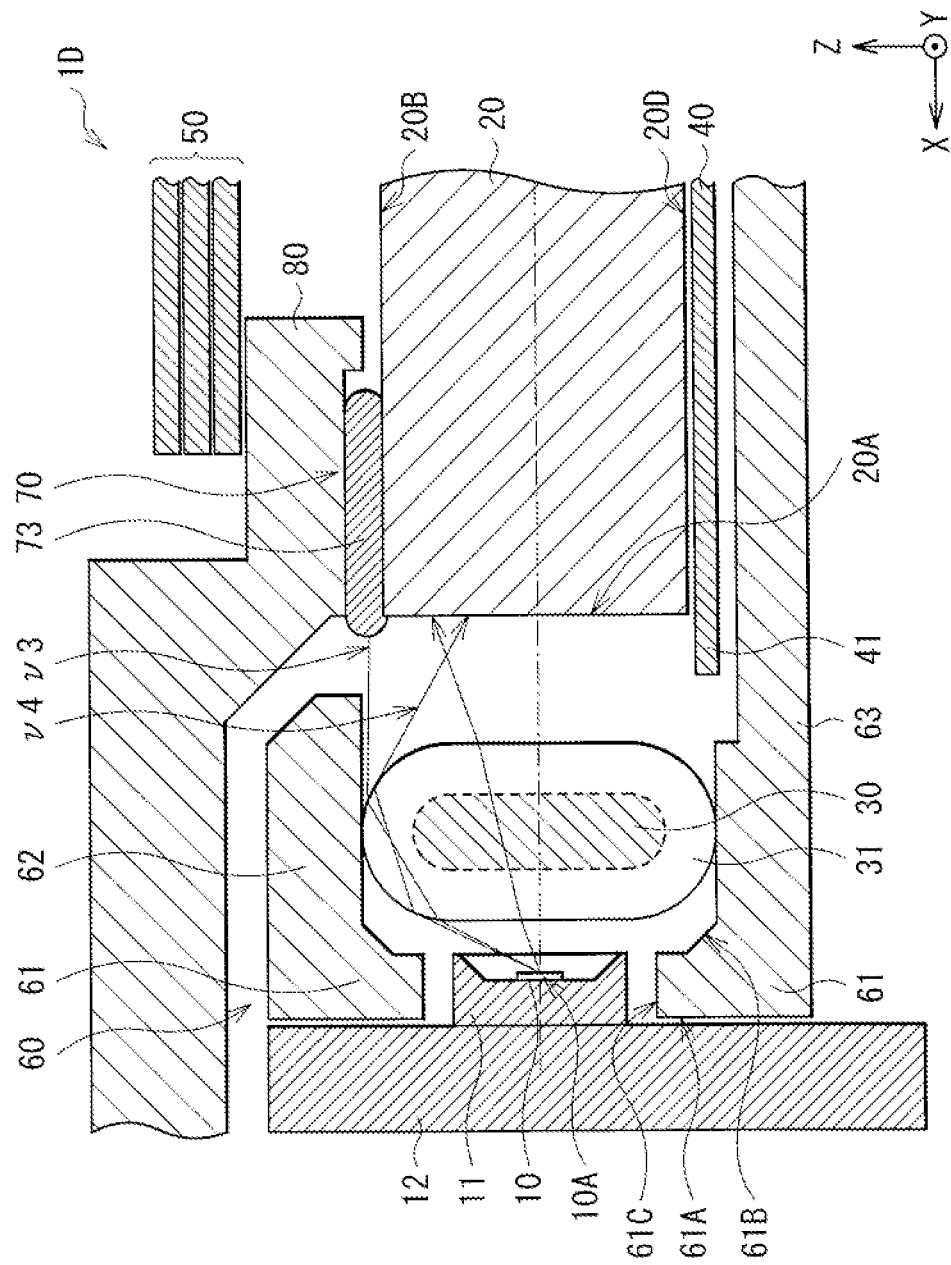
FIG. 11 is a cross-sectional view illustrating still another modification of the light emitting device shown in FIG. 4.

In addition thereto, it is more preferable that the optical sheet 50 be provided on the opposite side of the frame-like member 80 from the light shielding cushion 73 (above the frame-like member 80, that is, in the front (closer to the light emission observation surface)), as shown in a light emitting device 1D in FIG. 11. One reason is that this allows a width of the light shielding cushion 73 to be wider than that in FIG. 10, thereby allowing easy attachment of the light shielding cushion 73.

Figure 12:
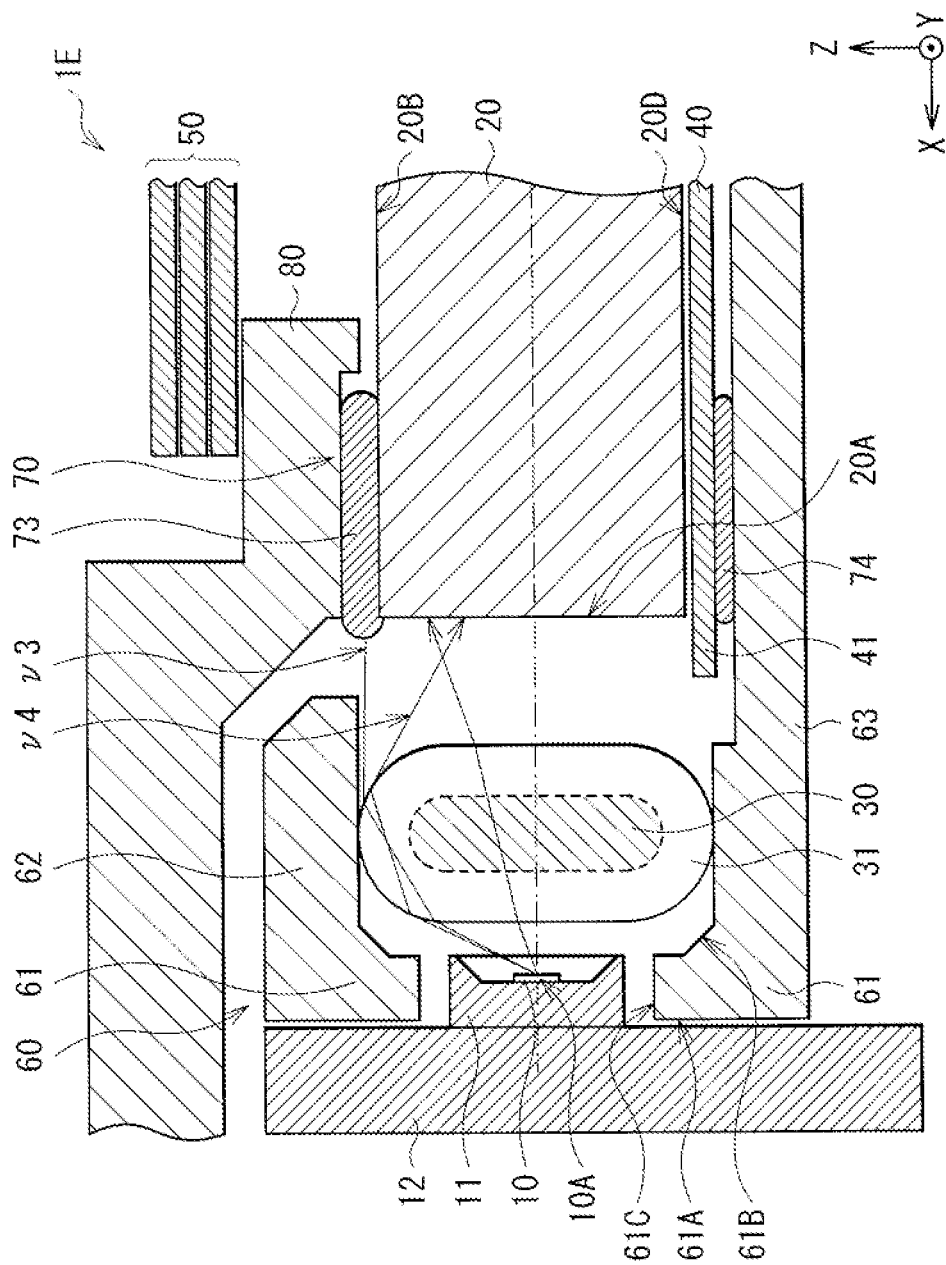
FIG. 12 is a cross-sectional view illustrating still another modification of the light emitting device shown in FIG. 4.

Moreover, it is also preferable to provide a lower cushion 74 on the light emitting surface 20D (back face) side of the light guide plate 20, specifically, between the reflection member 40 and the third holding portion 63 of the holding member 60, as shown in a light emitting device 1E in FIG. 12. This shields light that is emitted from the light source 10, passes through the container 31 without passing through the wavelength conversion member 30, and travels toward a surface adjacent to the light incident surface 20A of the light guide plate 20, namely, toward the light emitting surface 20D. This suppresses color unevenness caused by this light. Also, the lower cushion 74 has not only the light shielding function but also functions such as clearance adjustment and abnormal noise prevention as the light shielding cushion 73 described above. For example, polyethylene foam ("SUPER OPCELL (registered trademark)" available from Sanwa Kako Co., Ltd.) may be preferable as a material that configures the lower cushion 74.

In addition thereto, it is preferable that an end of the reflection member 40 extend over and out of the light guide plate 20 toward the light source 10 as shown in FIGS. 4 and 9 to 12. This shields light that is emitted from the light source 10, passes through the container 31 without passing through the wavelength conversion member 30, and travels toward a surface adjacent to the light incident surface 20A of the light guide plate 20, namely, toward the light emitting surface 20D. Thus, color unevenness caused by this light is suppressed. Moreover, a higher effect is further obtained when the light shielding protrusion 71 of the third holding portion 63 shown in FIG. 4 is used together or when the lower cushion 74 shown in FIG. 12 is used together.

In each of the light emitting devices 1A to 1E, as in the first embodiment, light emitted from the light source is subjected to wavelength conversion in the wavelength conversion member 30, enters the light incident surface 20A of the light guide plate 20, travels through the inside of the light guide plate 20, exits from the light emitting surface 20B, and passes through the optical sheet 50. This is observed as light emission.

At this time, the light v3 that is emitted from the light source 10, passes through the container 31 without passing through the wavelength conversion member 30, and travels toward the surface (the light emitting surface 20B or the light emitting surface 20D) adjacent to the light incident surface 20A of the light guide plate 20 is generated. The light v3 may pass through the space near the holding member 60, the frame-like member 80, etc., passes through the optical sheet 50, and may be emitted directly to the outside. This light v3 may cause the blue color unevenness B as shown in FIG. 6. In the present embodiments, the light shielding member 70 is provided on the light path of the light v3. Therefore, the light v3 that causes the color unevenness B is shielded by the light shielding member 70. Accordingly, evenness of color in a plane is further improved.

It is to be noted that there is light v4 that is emitted from the light source 10, passes through the container 31 without passing through the wavelength conversion member 30, passes through the space near the holding member 60, the frame-like member 80, etc., and enters the light incident surface 20A of the light guide plate 20, as shown in FIGS. 4 and 9 to 12. However, the light v4 is mixed, in the light guide plate 20, with light which has been subjected to wavelength conversion. Therefore, the light v4 is less likely to cause a significant issue such as color unevenness B caused by the light v3. Also, when the light v3 enters the light emitting surface 20B or 20D of the light guide plate 20, the light v3 is mixed, in the light guide plate 20, with light which has been subjected to wavelength conversion. Thus, the issue of color unevenness B is moderated.

As described above, in the present embodiments, the light shielding member 70 is provided on the light path of the light v3 that is emitted from the light source 10, passes through the container 31 without passing through the wavelength conversion member 30, and travels toward the surface adjacent to the light incident surface 20A of the light guide plate 20, namely, toward the light emitting surface 20B or the light emitting surface 20D. Therefore, the light v3 that causes color unevenness is shielded. Accordingly, evenness of color in a plane is further improved.

Third Embodiment

Figure 13:
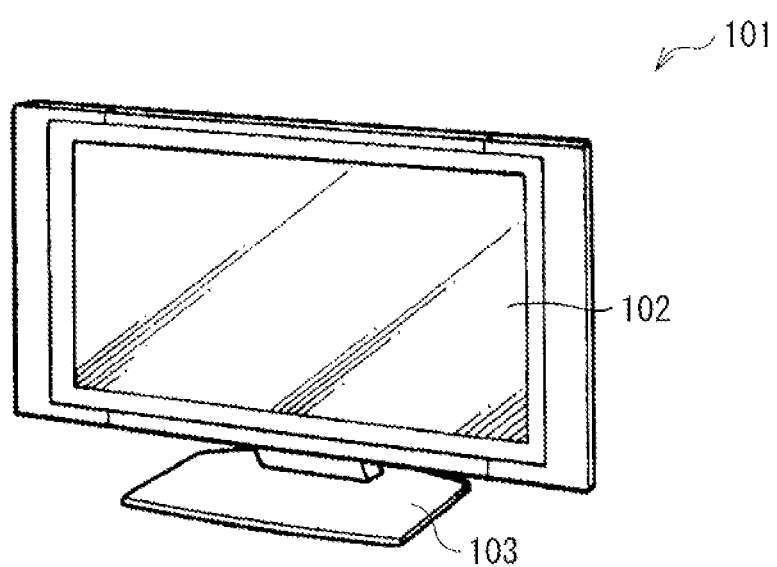
FIG. 13 is a perspective view illustrating an appearance of a display unit according to a third embodiment of the present disclosure.

FIG. 13 illustrates an appearance of a display unit 101 according to a third embodiment of the present disclosure. The display unit 101 may be used, for example, as a flat-screen television unit. The display unit 101 has a configuration in which a stand 103 holds a flat-plate-like main body section 102 for image display. The display unit 101 is used as a standing display unit that is placed on a horizontal surface such as a floor, a shelf, and a rack in a state where the stand 103 is attached to the main body section 102. However, it is to be noted that the display unit 101 may be used as a wall-hanging display unit in a state where the stand 103 is removed from the main body section 102.

Figure 14:
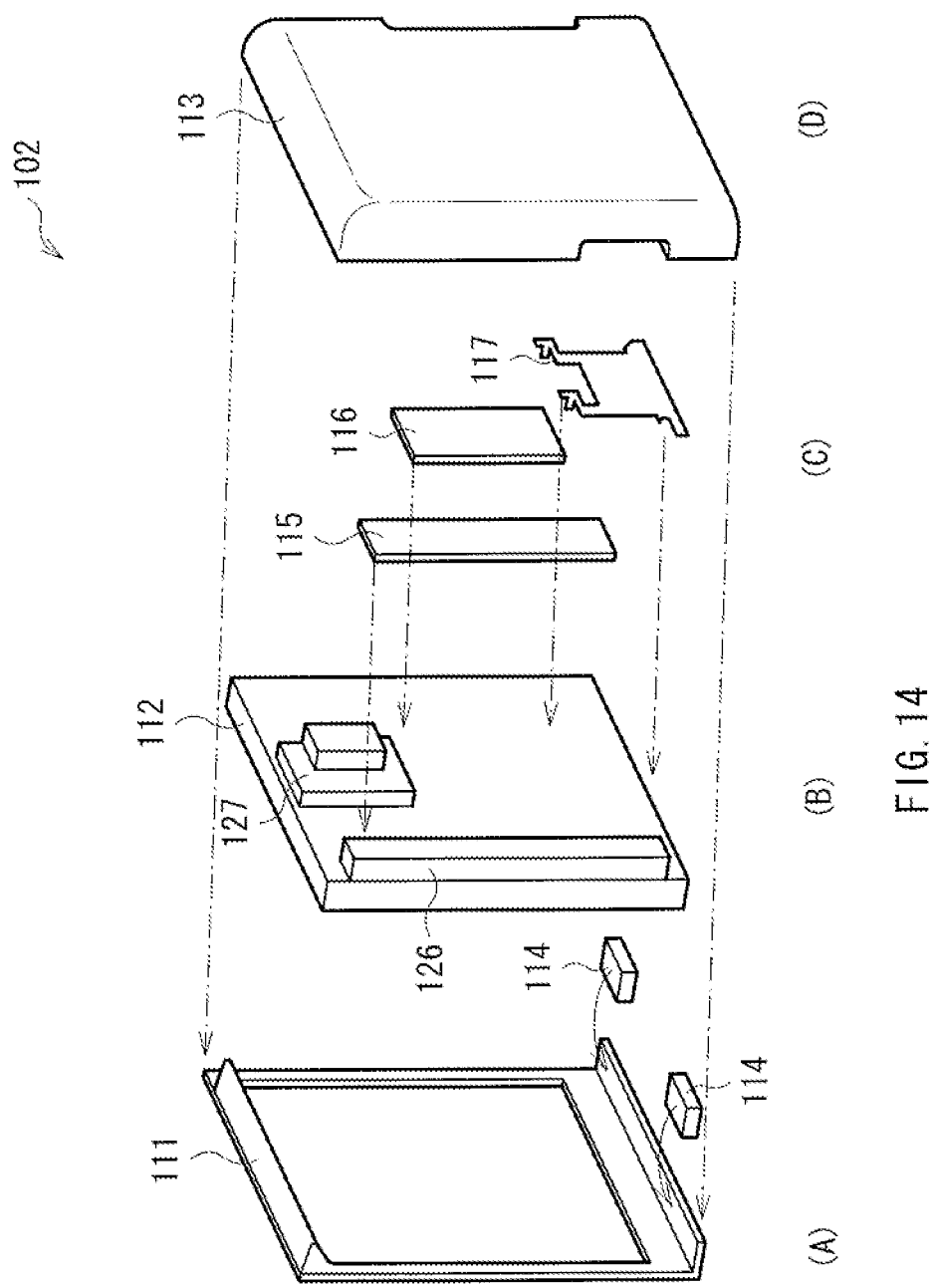
FIG. 14 is a perspective exploded view illustrating a main body part shown in FIG. 13.

FIG. 14 illustrates an exploded view of the main body section 102 shown in FIG. 13. The main body section 102 may include, for example, a front exterior member (bezel) 111, a panel module 112, and a back exterior member (rear cover) 113 in this order of closeness to a front face (to a viewer). The front exterior member 111 is a picture-frame-like member that covers front circumference of the panel module 112. A pair of speakers 114 are arranged in a lower part of the front exterior member 111. The panel module 112 is fixed to the front exterior member 111. An electric power source substrate 115 and a signal substrate 116 are mounted on a back face of the panel module 112 and an attachment bracket 117 is fixed thereto. The attachment bracket 117 is for attachment of a wall-hanging bracket, for attachment of components such as a substrate, and for attachment of the stand 103. The back exterior member 113 covers the back face and side faces of the panel module 112.

Figure 15:
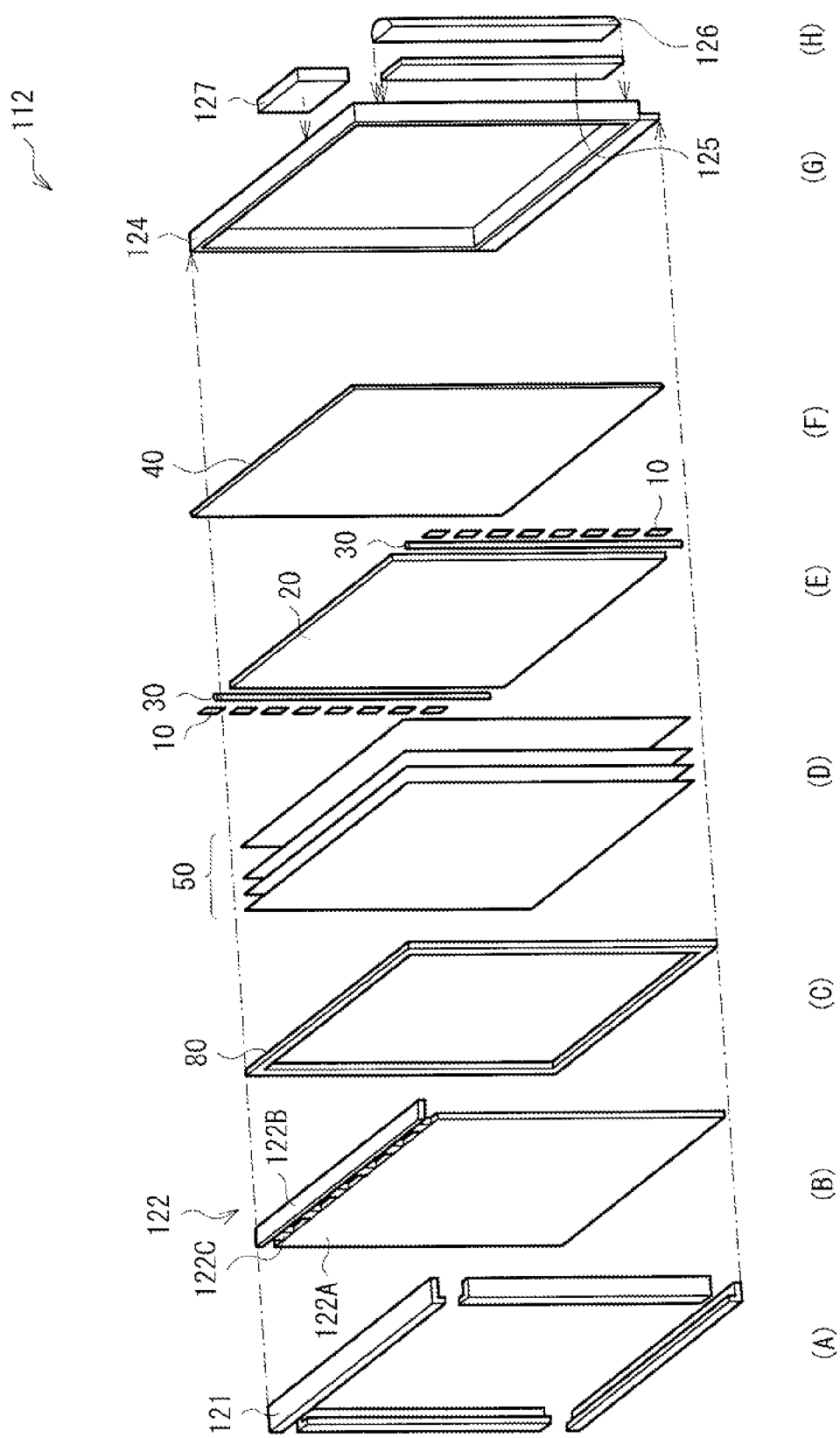
FIG. 15 is a perspective exploded view illustrating a panel module shown in FIG. 14.

FIG. 15 illustrates an exploded view of the panel module 112 shown in FIG. 13. The panel module 112 may include, for example, a front housing (top chassis) 121, a liquid crystal panel 122, the frame-like member (middle chassis) 80, the optical sheet 50, the light guide plate 20, the reflection member 40, a back housing (back chassis) 124, a balancer substrate 125, a balancer cover 126, and a timing controller substrate 127 in this order of closeness to the front face (to the viewer).

The front housing 121 is a frame-like metal component that covers front circumference of the liquid crystal panel 122. The liquid crystal panel 122 may include, for example, a liquid crystal cell 122A, a source substrate 122B, and a flexible substrate 122C such as COF (chip on film) that connects the liquid crystal cell 122A and the source substrate 122B. The frame-like member 80 is a frame-like resin component that holds the liquid crystal panel 122 and the optical sheet 50. The back housing 124 is a component made of metal such as iron (Fe) and contains the liquid crystal panel 122, the frame-like member 80, and the light emitting device 1. The balancer substrate 125 controls the light emitting device 1. The balancer substrate 125 is mounted on a back face of the back housing 124 and is covered with the balancer cover 126, as shown in FIG. 15. The timing controller substrate 127 is also mounted on the back face of the back housing 124.

In the display unit 101, light emitted from the light emitting device 1 is selectively transmitted by the liquid crystal panel 122, and an image is displayed thereby. In the present example, the display unit 101 includes the light emitting device 1 that has improved color evenness in a plane as described in the first embodiment. Therefore, display quality of the display unit 101 is improved.

It is to be noted that, although a case in which the display unit 101 includes the light emitting device 1 according to the first embodiment is described above in the third embodiment, it goes without saying that the display unit 101 may include any of the light emitting devices 1A to 1E according to the second embodiment instead of the light emitting device 1 according to the first embodiment.

[Application Examples of Display Unit]

Examples in which the above-described display unit 101 is applied to electronic apparatuses will be described below.

Examples of the electronic apparatus include televisions, digital cameras, notebook personal computers, personal digital assistants such as mobile phones, and video camcorders. In other words, the above-described display unit is applicable to an electronic apparatus in any filed that uses an externally-inputted or internally-generated image signal to display an image or a moving picture.

Application Example 1

Figure 16A:
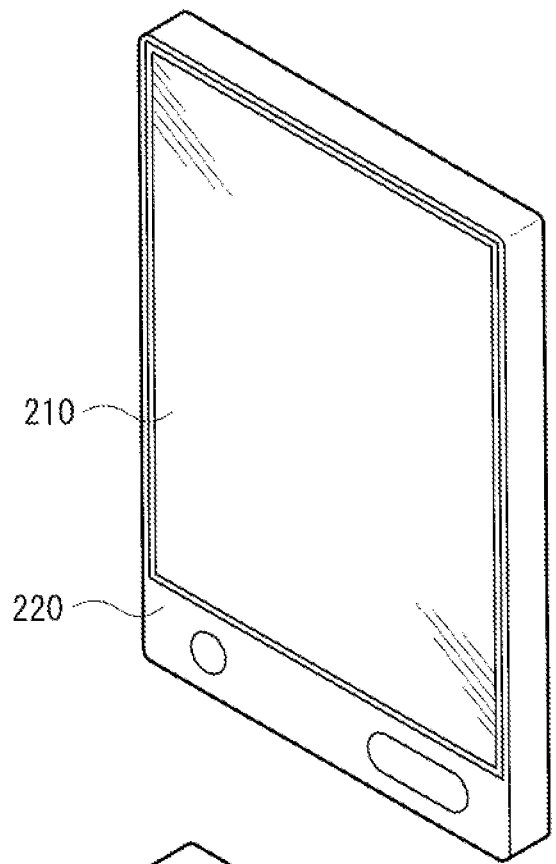
FIGS. 16A and 16B are perspective views each illustrating an appearance of an application example 1 of the display unit.
Figure 16B:
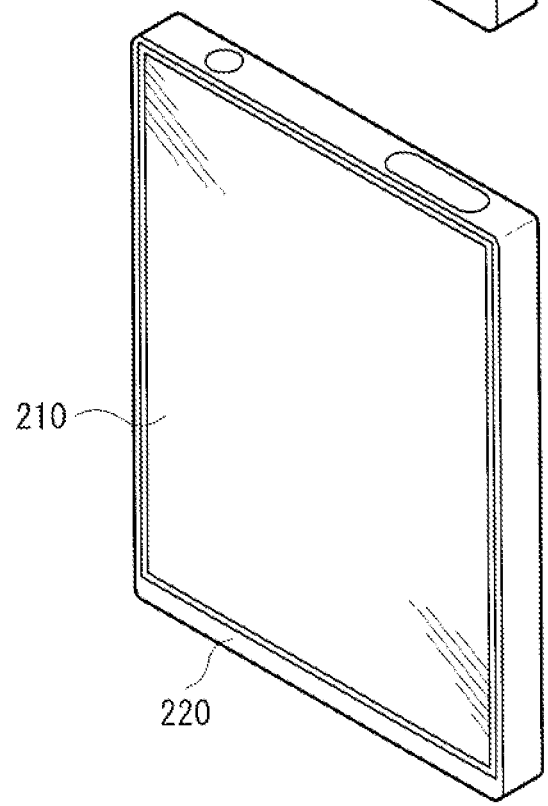

FIGS. 16A and 16B each illustrate an appearance of an electronic book to which the display unit 101 of the above-described embodiment is applied. The electronic book may include, for example, a display section 210 and a non-display section 220. The display section 210 is configured of the display unit 101 of the above-described embodiment.

Application Example 2

Figure 17:
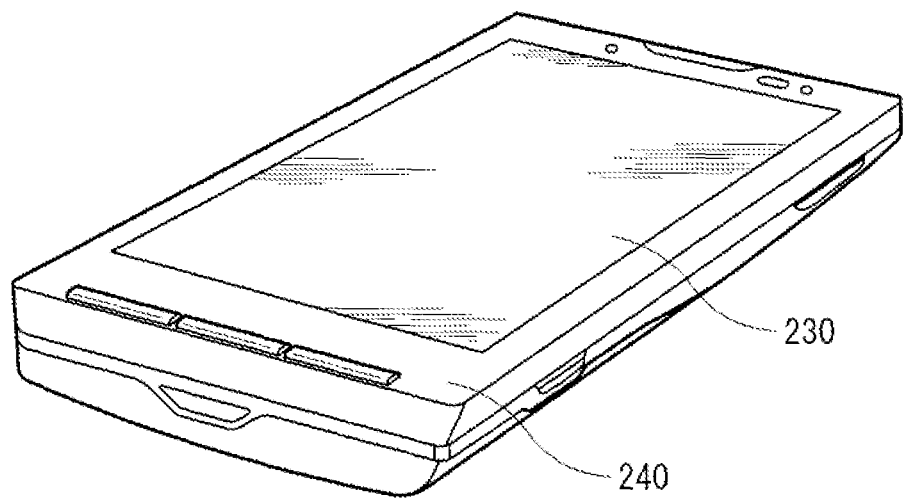
FIG. 17 is a perspective view illustrating an appearance of an application example 2.

FIG. 17 illustrates an appearance of a smartphone to which the display unit 101 of the above-described embodiment is applied. The smartphone may include, for example, a display section 230 and a non-display section 240. The display section 230 is configured of the display unit 101 of the above-described embodiment.

Application Example 3

Figure 18A:
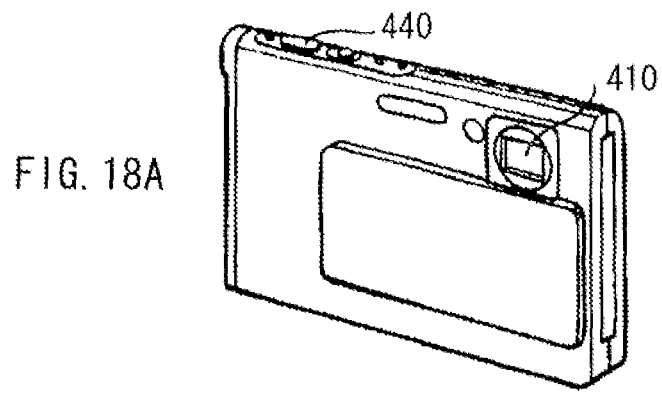
FIGS. 18A and 18B are perspective views illustrating an appearance of an application example 3 seen from the front and from the back, respectively.
Figure 18B:
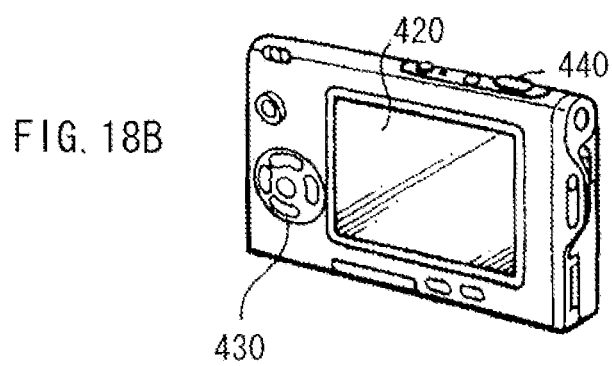

FIG. 18 illustrates an appearance of a digital camera to which the display unit 101 of the above-described embodiment is applied. The digital camera may include, for example, a light emitting section 410 for a flash, a display section 420, and a menu switch 430, and a shutter button 440. The display section 420 is configured of the display unit 101 of the above-described embodiment.

Application Example 4

Figure 19:
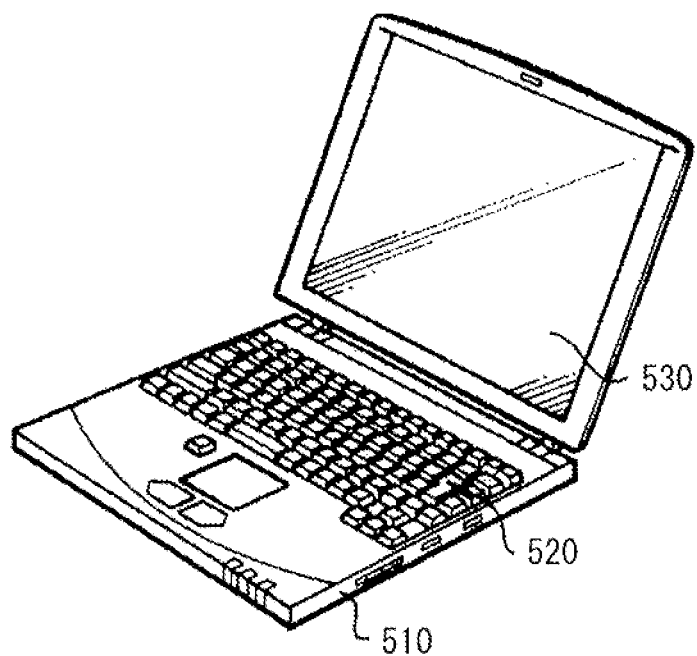
FIG. 19 is a perspective view illustrating an appearance of an application example 4.

FIG. 19 illustrates an appearance of a notebook personal computer to which the display unit 101 of the above-described embodiment is applied. The notebook personal computer may include, for example, a main body 510, a keyboard 520 for operations of inputting characters etc., and a display section 530 that displays an image. The display section 530 is configured of the display unit 101 of the above-described embodiment.

Application Example 5

Figure 20:
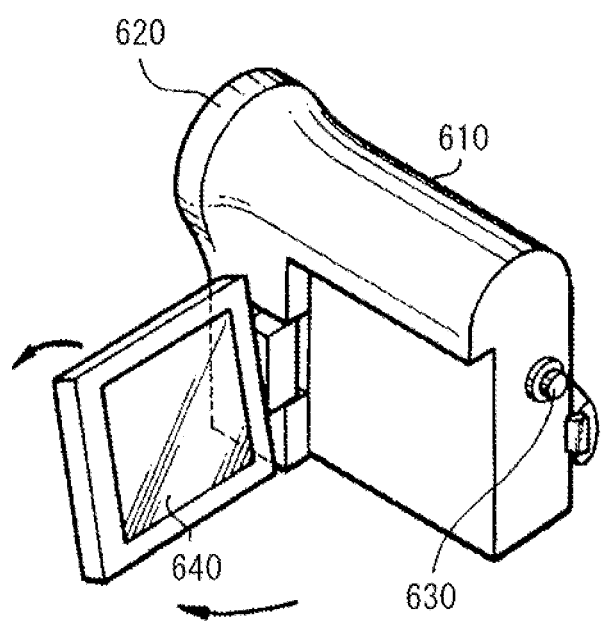
FIG. 20 is a perspective view illustrating an appearance of an application example 5.
Figure 21:
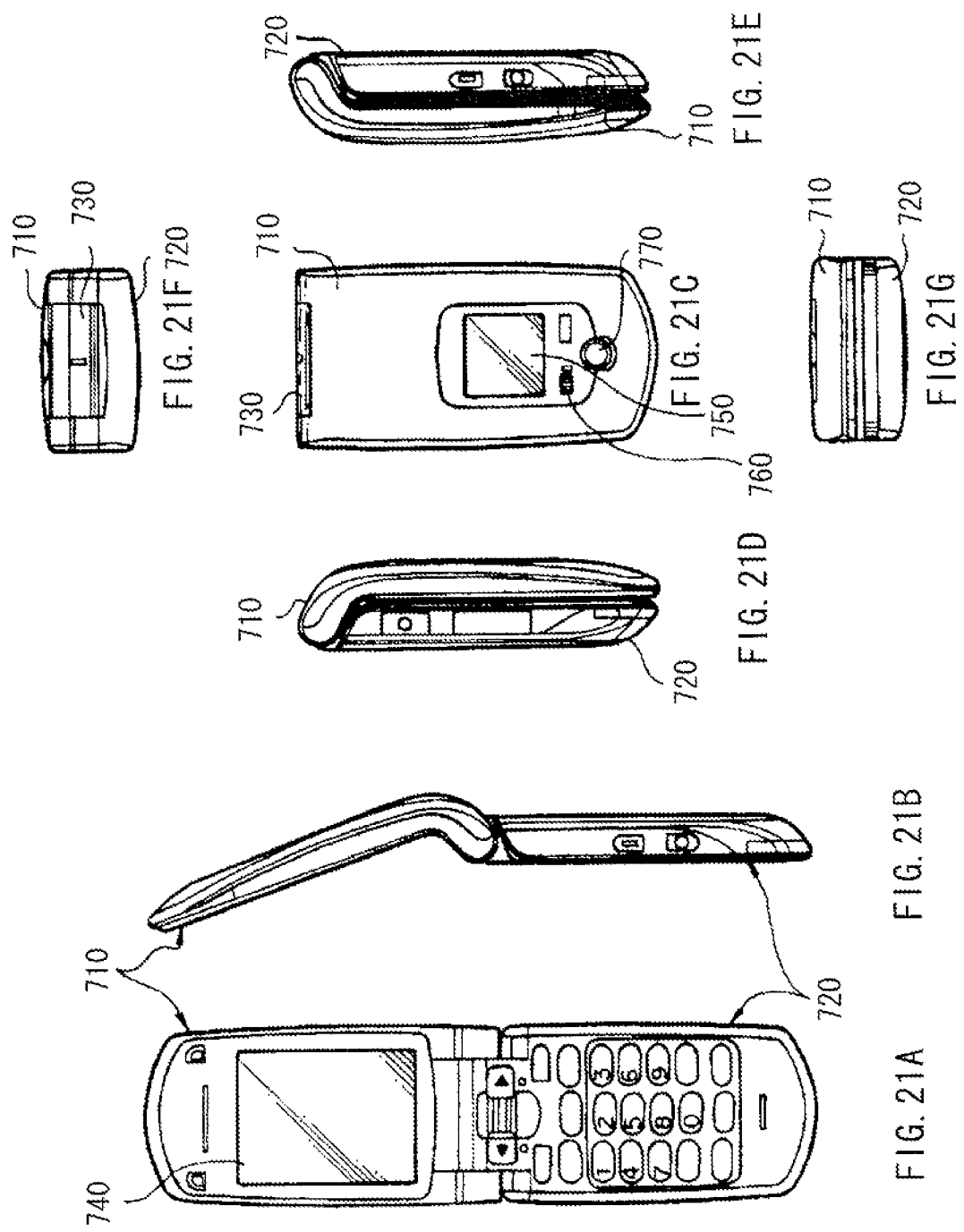
FIGS. 21A and 21B are a front view and a side view of an application example 6 in an open state, respectively.
FIGS. 21C to 21G are a front view, a left side view, a right side view, a top view, and a bottom view of the application example 6 in a closed state, respectively.

FIG. 20 illustrates an appearance of a video camcorder to which the display unit 101 of the above-described embodiment is applied. The video camcorder may include, for example, a main body section 610, a lens 620 for shooting an object that is provided in a front side face of the main body section 610, a start-stop switch 630 used in shooting, and a display section 640. The display section 640 is configured of the display unit 101 of the above-described embodiment.

Application Example 6

FIGS. 21A to 21G each illustrate an appearance of a mobile phone to which the display unit 101 of the above-described embodiment is applied. The mobile phone may be configured, for example, of a top housing 710 and a bottom housing 720 that are connected by a connection section (hinge section) 730. The mobile phone may include, for example, a display 740, a sub-display 750, a picture light 760, and a camera 770. One or both of the display 740 and the sub-display 750 are each configured of the display unit 101 of the above-described embodiment.

[Application Example of Illumination Unit]

Figure 22:
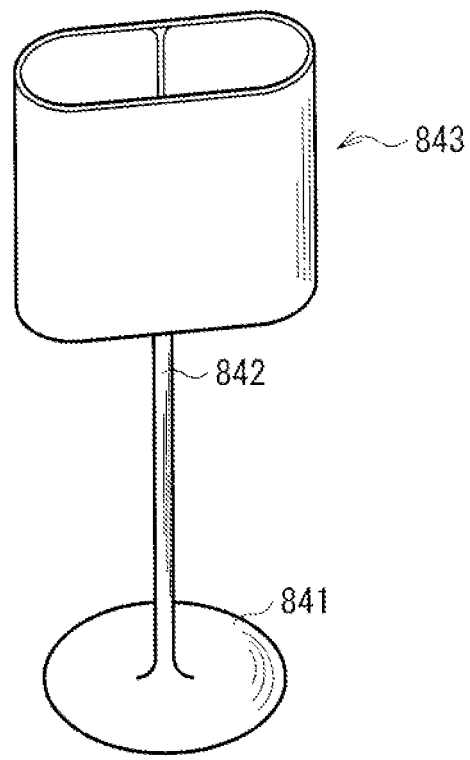
FIG. 22 is a perspective view illustrating an appearance of an application example 7 of an illumination unit.
Figure 23:
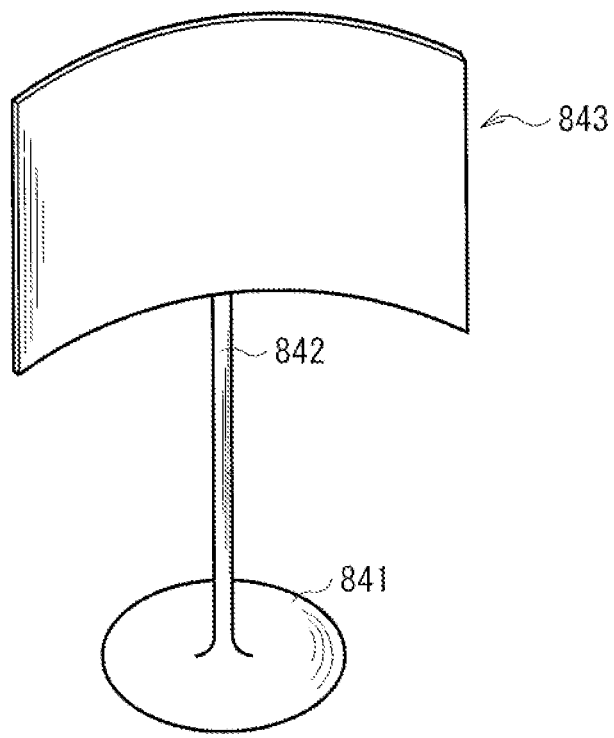
FIG. 23 is a perspective view illustrating an appearance of an application example 8 of the illumination unit.

FIGS. 22 and 23 each illustrate an appearance of a desk illumination unit to which any of the light emitting devices 1 and 1A to 1E of the above-described embodiments is applied. The illumination unit may include, for example, a post 842 that is provided on a base 841 and an illumination section 843 that is attached to the post 842. The illumination section 843 is configured of any of the light emitting devices 1 and 1A to 1E according to the above-described first and second embodiments. The illumination section 843 may have any shape such as a rolled shape shown in FIG. 22 and a curved-face shape shown in FIG. 23, by allowing the light guide plate 20 to have a curved shape.

Figure 24:
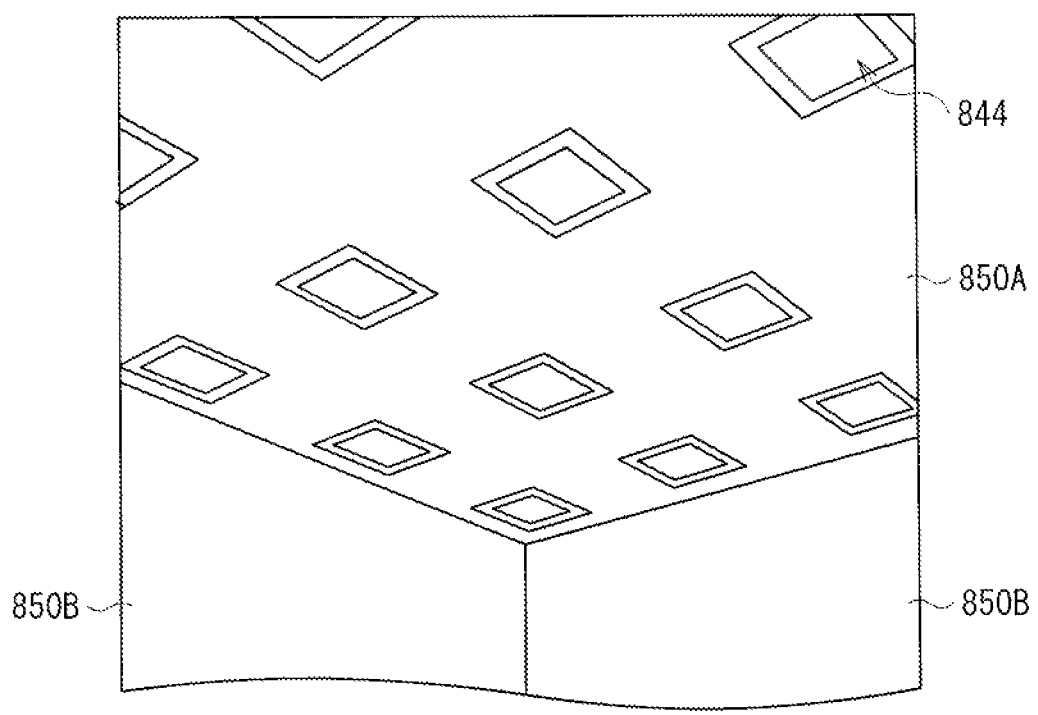
FIG. 24 is a perspective view illustrating an appearance of an application example 9 of the illumination unit.

FIG. 24 illustrates an appearance of a room illumination unit to which any of the light emitting devices 1 and 1A to 1E of the above-described embodiments is applied. The illumination unit may include, for example, an illumination section 844 that is configured of any of the light emitting devices 1 and 1A to 1E according to the above-described embodiments. The illumination sections 844 are arranged in the appropriate number at an appropriate interval on a sealing 850A of a building. It is to be noted that the illumination section 844 is not limitedly provided on the sealing 850A and may be provided in any place such as on a wall 850B and on a floor (not illustrated) according to the application.

The illumination unit performs illumination with use of light emitted from the light emitting device 1. In the present example, the illumination unit includes the light emitting device 1 with improved color evenness in a plane as described in the first embodiment. Therefore, illumination quality is improved.

Hereinbefore, the present disclosure has been described with reference to the preferred embodiments. However, the present disclosure is not limited to the above-described embodiments and may be variously modified. For example, the material, the thickness, etc. of each layer described above in the embodiments are not limitative and other materials, other thicknesses, etc. may be used.

Moreover, for example, although a case in which the light source 10 is an LED has been described above in the embodiments, the light source 10 may be configured of a component such as a semiconductor laser.

Moreover, for example, the configurations of the light emitting devices 1 and 1A to 1E and the display unit 101 (television unit) have been described above with specific examples in the embodiments. However, it is not necessary to include all of the components and other components may be further included.

In addition thereto, a case in which the wavelength conversion member 30 is sealed in the container 31 has been described above in the embodiments. However, the wavelength conversion member 30 may be a sheet-like member in which a fluorescent material or a quantum dot is dispersed in a resin sheet.

Moreover, the edge-light type light emitting device 1 in which light emitted from the light source 10 is guided to the light incident surface 20A which is the end face of the light guide plate 20 and is emitted from the light emitting surface 20B toward the front face has been described above in the embodiment. However, the present disclosure is also applicable to a direct type light emitting device in which the light source 10 is arranged in a plane and a diffuser is arranged as an optical component above the light source 10.

It is possible to achieve at least the following configurations from the above-described example embodiments and the modifications of the disclosure.

(1) A light emitting device including:
a light source;
an optical component including a light incident surface, the light incident surface facing the light source; and
a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

(2) The light emitting device according to (1), further including
a container containing the wavelength conversion member.

(3) The light emitting device according to (2), further including
a light shielding member provided on a light path of light that is emitted from the light source, passes through the container without passing through the wavelength conversion member, and travels toward a surface adjacent to the light incident surface of the optical component.

(4) The light emitting device according to (3), wherein the light shielding member is a light shielding cushion covering an end of the surface adjacent to the light incident surface of the optical component.

(5) The light emitting device according to (4), further including:
an optical sheet provided on the surface adjacent to the light incident surface of the optical component; and
a frame-like member holding the optical sheet, wherein
the light shielding cushion is sandwiched between the frame-like member and the optical component.

(6) The light emitting device according to (5), wherein the optical sheet is provided on an opposite side of the frame-like member from the light shielding cushion.

(7) The light emitting device according to (3), further including
a holding member holding the container, wherein
the light shielding member is a light shielding protrusion that is provided on the holding member.

(8) The light emitting device according to (3), further including
an optical sheet provided on the surface adjacent to the light incident surface of the optical component; and
a frame-like member holding the optical sheet, wherein
the light shielding member is a shielding protrusion provided on the frame-like member.

(9) The light emitting device according to any one of (1) to (8), wherein the light source is a point light source.

(10) The light emitting device according to any one of (1) to (9), wherein the wavelength conversion member includes a fluorescent material.

(11) The light emitting device according to (1), wherein the wavelength conversion member includes a quantum dot.

(12) The light emitting device according to any one of (1) to (11), wherein the light source is a blue light source.

(13) The light emitting device according to (12), wherein the light source is configured of a light emitting diode.

(14) The light emitting device according to any one of (1) to (13), wherein
the optical component is a light guide plate, and
the light incident surface is an end face of the light guide plate.

(15) A display unit with a liquid crystal panel and a light emitting device on a back face side of the liquid crystal panel, the light emitting device including:
a light source;
an optical component including a light incident surface, the light incident surface facing the light source; and
a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

(16) An illumination unit with a light emitting device, the light emitting device including:
a light source;
an optical component including a light incident surface, the light incident surface facing the light source; and
a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface.

It should be understood by those skilled in the art that various modifications, combinations, sub-combinations, and alterations may occur depending on design requirements and other factors insofar as they are within the scope of the appended claims or the equivalents thereof.

What is claimed is:
1. A light emitting device comprising:
a light source;
an optical component including a light incident surface, the light incident surface facing the light source; and
a wavelength conversion member to convert a wavelength of at least a portion of light emitted from the light source from a first wavelength to a second wavelength which is different from the first wavelength, said wavelength conversion member being provided between the light source and the light incident surface, the wavelength conversion member crossing a first region and extending to a second region outside the first region, the first region being surrounded by the light incident surface and light paths of light that is emitted from the light source and enters edges of the light incident surface,
the light source is a blue light source, and
the wavelength conversion member is configured to convert the wavelength of at least the portion of the blue light emitted from the blue light source from the first wavelength which corresponds to the blue light to the second wavelength which corresponds to either red light or green light, so as to convert the blue light into either the red light or the green light.

2. The light emitting device according to claim 1, further comprising
a container containing the wavelength conversion member.

3. The light emitting device according to claim 2, further comprising
a light shielding member provided on a light path of light that is emitted from the light source, passes through the container without passing through the wavelength conversion member, and travels toward a surface adjacent to the light incident surface of the optical component.

4. The light emitting device according to claim 3, wherein the light shielding member is a light shielding cushion covering an end of the surface adjacent to the light incident surface of the optical component.

5. The light emitting device according to claim 4, further comprising:
an optical sheet provided on the surface adjacent to the light incident surface of the optical component; and
a frame-like member holding the optical sheet, wherein the light shielding cushion is sandwiched between the frame-like member and the optical component.

6. A light emitting device comprising:
a light source;
an optical component including a light incident surface, the light incident surface facing the light source;
a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface;
a container containing the wavelength conversion member; and
a light shielding member provided on a light path of light that is emitted from the light source, passes through the container without passing through the wavelength conversion member, and travels toward a surface adjacent to the light incident surface of the optical component,
wherein the light shielding member is a light shielding cushion covering an end of the surface adjacent to the light incident surface of the optical component,
further comprising:
an optical sheet provided on the surface adjacent to the light incident surface of the optical component; and
a frame-like member holding the optical sheet,
wherein the light shielding cushion is sandwiched between the frame-like member and the optical component, and
wherein the optical sheet is provided on an opposite side of the frame-like member from the light shielding cushion.

7. A light emitting device comprising:
a light source;
an optical component including a light incident surface, the light incident surface facing the light source;
a wavelength conversion member provided between the light source and the light incident surface, the wavelength conversion member crossing a first region and extending to a second region outside the first region, the first region being surrounded by the light incident surface and light paths of light that is emitted from the light source and enters edges of the light incident surface;
a container containing the wavelength conversion member;
a light shielding member provided on a light path of light that is emitted from the light source, passes through the container without passing through the wavelength conversion member, and travels toward a surface adjacent to the light incident surface of the optical component; and
a holding member holding the container,
wherein the light shielding member is a light shielding protrusion that is provided on the holding member.

8. The light emitting device according to claim 3, further comprising
an optical sheet provided on the surface adjacent to the light incident surface of the optical component; and
a frame-like member holding the optical sheet, wherein the light shielding member is a shielding protrusion provided on the frame-like member.

9. The light emitting device according to claim 1, wherein the light source is a point light source.

10. The light emitting device according to claim 1, wherein the wavelength conversion member includes a fluorescent material.

11. The light emitting device according to claim 1, wherein the wavelength conversion member includes a quantum dot.

12. The light emitting device according to claim 1, wherein the light source is configured of a light emitting diode.

13. The light emitting device according to claim 1, wherein
the optical component is a light guide plate, and
the light incident surface is an end face of the light guide plate.

14. A display unit with a liquid crystal panel and a light emitting device on a back face side of the liquid crystal panel, the light emitting device comprising:
a light source;
an optical component including a light incident surface, the light incident surface facing the light source; and
a wavelength conversion member to convert a wavelength of at least a portion of light emitted from the light source from a first wavelength to a second wavelength which is different from the first wavelength, said wavelength conversion member being provided between the light source and the light incident surface, the wavelength conversion member crossing a first region and extending to a second region outside the first region, the first region being surrounded by the light incident surface and light paths of light that is emitted from the light source and enters edges of the light incident surface,
the light source is a blue light source, and
the wavelength conversion member is configured to convert the wavelength of at least the portion of the blue light emitted from the blue light source from the first wavelength which corresponds to the blue light to the second wavelength which corresponds to either red light or green light, so as to convert the blue light into either the red light or the green light.

15. An illumination unit with a light emitting device, the light emitting device comprising:
a light source;
an optical component including a light incident surface, the light incident surface facing the light source; and
a wavelength conversion member to convert a wavelength of at least a portion of light emitted from the light source from a first wavelength to a second wavelength which is different from the first wavelength, said wavelength conversion member being provided between the light source and the light incident surface, the wavelength conversion member crossing a first region and extending to a second region outside the first region, the first region being surrounded by the light incident surface and light paths of light that is emitted from the light source and enters edges of the light incident surface,
the light source is a blue light source, and
the wavelength conversion member is configured to convert the wavelength of at least the portion of the blue light emitted from the blue light source from the first wavelength which corresponds to the blue light to the second wavelength which corresponds to either red light or green light, so as to convert the blue light into either the red light or the green light.

* * * * *